United States Patent
Simmons et al.

(10) Patent No.: US 7,209,870 B2
(45) Date of Patent: Apr. 24, 2007

(54) HEATING, VENTILATING, AND AIR-CONDITIONING DESIGN APPARATUS AND METHOD

(75) Inventors: Joseph V. Simmons, Highland, UT (US); Benjamin L. Davis, Riverton, UT (US); Alan L. Nicoll, Lehi, UT (US)

(73) Assignee: HVAC Holding Company, L.L.C., American Fork, UT (US)

( * ) Notice: Subject to any disclaimer, the term of this patent is extended or adjusted under 35 U.S.C. 154(b) by 762 days.

(21) Appl. No.: 09/976,187

(22) Filed: Oct. 12, 2001

(65) Prior Publication Data

US 2003/0208341 A9   Nov. 6, 2003

Related U.S. Application Data

(60) Provisional application No. 60/240,197, filed on Oct. 12, 2000.

(51) Int. Cl.
   *G06F 17/50* (2006.01)
(52) U.S. Cl. ............... 703/1; 703/6; 703/8; 705/26; 236/46 R
(58) Field of Classification Search .............. 703/1, 703/2, 6, 8; 709/225, 315; 236/46, 44, 44 R, 236/46 R; 750/400; 713/1; 705/26
   See application file for complete search history.

(56) References Cited

U.S. PATENT DOCUMENTS

| | | | | |
|---|---|---|---|---|
| 4,885,694 A | * | 12/1989 | Pray et al. .................. | 705/400 |
| 4,964,060 A | | 10/1990 | Hartsog ....................... | 364/512 |
| 5,227,983 A | | 7/1993 | Cox et al. .................... | 364/512 |
| 5,293,479 A | | 3/1994 | Quintero et al. ............. | 295/161 |
| 5,895,454 A | * | 4/1999 | Harrington ................... | 705/26 |
| 6,076,739 A | * | 6/2000 | Littleford et al. ......... | 236/44 R |
| 6,131,077 A | | 10/2000 | Normann et al. .............. | 703/1 |
| 6,134,511 A | * | 10/2000 | Subbarao ...................... | 703/6 |
| 6,169,987 B1 | | 1/2001 | Knoblock et al. ............ | 707/10 |
| 6,179,213 B1 | * | 1/2001 | Gibino et al. ............. | 236/46 R |
| 6,651,037 B1 | * | 11/2003 | Hall et al. .................... | 703/8 |
| 6,785,805 B1 | * | 8/2004 | House et al. .................. | 713/1 |
| 2001/0037412 A1 | * | 11/2001 | Miloushev et al. ......... | 709/315 |
| 2003/0154279 A1 | * | 8/2003 | Aziz .......................... | 709/225 |

OTHER PUBLICATIONS

Laine et al., "Better IAQ through integrating design tools for the HVAC industry", Proceedings of the Healthy Bulidings, 2000, vol. 4, Aug. 2000.*

* cited by examiner

*Primary Examiner*—Paul Rodriguez
*Assistant Examiner*—Kandasamy Thangavelu
(74) *Attorney, Agent, or Firm*—Pate Pierce & Baird

(57) ABSTRACT

A system and method for designing an HVAC system using a database to manage values of properties corresponding to design elements. Elements include substantially all physical components and connections available for creating an HVAC system design. A user interface represents design elements arbitrarily selectable by a user and connectable to one another in a schematic to establish the HVAC system design. The system may provide, automatically, default values corresponding to the properties corresponding to the design elements. A user may select arbitrarily, from the design elements, an arbitrary number of selected design elements to be interconnected in the HVAC system design. A user may place and interconnect each arbitrary design element, while the system calculates, automatically, values of properties characterizing the arbitrary design elements; validating correctness of the interconnections and properties, calculating performance parameters, and providing drawings.

27 Claims, 17 Drawing Sheets

HEATING, VENTILATING, AND AIR-CONDITIONING DESIGN APPARATUS AND METHOD

RELATED APPLICATIONS

This Patent Application claims the benefit of U.S. Provisional Application Serial No. 60/240,197 filed Oct. 12, 2000 and entitled HEATING, VENTILATING, AND AIR-CONDITIONING DESIGN APPARATUS AND METHOD.

BACKGROUND

1. The Field of the Invention

This invention relates to software and computer systems and, more particularly, to novel systems and methods for design modeling of fluid and energy handling systems.

2. The Background Art

The need to condition the environment in which people live has existed as long as sun, rain, and winter storms. The solutions have been many and varied, depending on the availability of shelter, fuels, cooling materials, insulation, fans, and so forth. In more recent history, refrigeration systems, heating systems, and their various combinations have taken advantage of new thermodynamic cycles and a wide variety of working fluids.

Nevertheless, much of the process of designing systems for heating, ventilating, and air conditioning (HVAC) is an iterative process of design and analysis. Moreover, a change in a parameter may affect the performance of many other parameters, or limit the applicability of other equipment, configurations, or analyses. Also, the methods used for design and analysis will often require considerable familiarity with both engineering principles and available manufactured equipment. Much of the design process is beyond the intuitive sense of an individual. Documentation is likewise esoteric and non-intuitive.

What is needed is a system for rapidly designing, analyzing, and redesigning HVAC systems. It would be an advancement in the art to rely on an object oriented programming system and intuitive, visual icons. It would be a further advance in the art to provide automatic calculation of interface information, thus keeping the specifications and performance parameters consistent among associated components.

There are many stages involved in the design and implementation of an HVAC system. The first stage is to design a building that an HVAC system will serve. A loads program is used to calculate airflow and heating requirements for the building, based on established codes. An HVAC system must then be designed, using available components. A control system must be designed to control the HVAC system. And finally, all the components of the system must be purchased and installed. This process requires that each step use the output of a previous step. Often, the data used by one step must be manually extracted from the output data of a preceding step. The extracted data may then need to be manually converted to a computer readable form.

What is needed is a system capable of integrating the many steps of the design process, enabling each step to automatically extract needed information from the preceding step. Such a system would enable for information to be entered into a computer once, rather than at each stage of the design process.

BRIEF SUMMARY AND OBJECTS OF THE INVENTION

In view of the foregoing, it is a primary object of the present invention to provide an apparatus and method to design, analyze, and document HVAC systems.

It is an object to provide an intuitive, graphical system relying on object-oriented programming and intuitive icons.

It is an object of the present invention to enable a designer to easily create many different, yet consistently schematic representations of various aspects of the same design.

It is an object of the present invention to provide a method and apparatus to integrate steps of the design process into a single system, enabling each step to automatically use the output of a preceding step.

is an object of the present invention to provide a method and apparatus to access the descriptions of actual HVAC system equipment and use them in the design and analysis processes.

It is an object of the present invention to provide a software application for interacting directly with software independently provided by an equipment vendor unrelated to the designer or the provider of HVAC system design software. This enables an HVAC system designer to more easily use the actual properties of available components in the design and analysis process.

It is an object of the present invention to provide a system for automatically determining design parameters, freeing a user from having to make numerous routine design decisions, and reducing the level of skill required to design an HVAC system.

It is an object of the present invention to provide a system to create a design for an HVAC system and use that design to create a plan or design of a corresponding control system for controlling an implementation of the HVAC design.

It is an object of the present invention to provide a system for automatically obtaining information concerning manufactured equipment suitable for use in an HVAC system. This may include new products, modifications made to the properties of existing products, the current cost of products, the availability of products, and the like.

It is an object of the present invention to provide a system enabling a user to contact businesses supplying or manufacturing HVAC system equipment components (design elements).

It is an object of the present invention to provide a system whereby a business may be credited financially for providing software to a user who subsequently uses the software to make a purchasing decision. This may involve a manufacturer paying a commission to the provider of the software whenever a user of the software decides to use the manufacturer's equipment in a design provided by the software.

Consistent with the foregoing objects, and in accordance with the invention as embodied and broadly described herein, a method and apparatus are disclosed in one embodiment of the present invention as including an application that is executable on a general purpose digital computer. The application presents graphical icons representing equipment, connectors, and all other components (collectively, design elements) that may be used to assemble a model of an HVAC system, including all specified components operably connected together.

An apparatus and method in accordance with the invention may include an article configured as a computer-readable medium storing data structures of both executable and operational types. Data structures may include an input module configured to receive inputs corresponding to design elements, characterized by properties stored in records, the design elements being connectable to establish an HVAC system to be designed. The system may include a design module operably connected to the input module and configured to operate on the inputs to create the records reflecting the properties of the design elements and interactions thereof to establish a design of the HVAC system.

The input module and design module together may be further configured to automatically provide multiple schematic representations of a selected design element, selected from the design elements. The multiple schematic representations may reflect distinct operational contexts of the selected design element. These modules may be programmed to automatically maintain substantially complete and consistent information in the records, describing the properties of the selected design element in each of the distinct operational contexts.

The system may include an output module configured to provide user-interpretable output, machine interpretable output, or both, reflecting the design of the HVAC system. In certain embodiments the system may further comprise a user interface module configured to receive inputs from a user to control selection, relative positioning, and properties of design elements of the HVAC system to be designed. The user interface may also output to a user a graphical representation of the HVAC system reflecting the selection, relative positioning, and properties of the design elements.

The input module and user interface module may be configured to interface with the design module substantially independently from one another. The input module may include the user interface module configured to receive inputs from a user to control selection, relative positioning, and properties of design elements of the HVAC system to be designed. The user interface module may also output to a user a graphical representation of the HVAC system reflecting the selection, relative positioning, and properties of the design elements.

The operational contexts may be selected from such conditions or events as mass transport, energy transport, space considerations, power or other performance limitations, or the like. Mass transport may include at least one of air transport and water transport. Energy transport may include one or more modes such as heating or cooling with respect to any selected design element (e.g. hardware, component).

A selected design element may be or include a product available from a vendor, independent from the system design software provider. The product may be characterized by product properties. The design module may include a specification module, executable to assign the product properties as the properties of the selected design element.

The data structures may include a product module configured to manage data reflecting the product properties. The product module itself may include an updating module configured to update the product properties.

In certain embodiments, the data structures may include a communication module configured to automatically establish communication between a user and the vendor of the product. The communication module may be tasked with making inquiries of the vendor, placing orders with the vendor, and downloading updated values of the product properties from the vendor.

The system may interact with one or more third party modules provided by a third party, where a product module holds all data and interfaces with vendor software. The data structures may include or interact with a load module configured to provide, to the input module, HVAC loading parameters required to be accommodated by the HVAC system design, a CAD module configured to provide, to the input module, data reflecting a design of an edifice to be serviced by the design of the HVAC system, or both. The product module may be configured to specify products available for sale and meeting requirements to be the design elements.

A compensation module may be configured to identify monetary compensation due to a user from vendors of the products specified as design elements in the HVAC system design. The input module may be configured to interact with one or more other modules or applications. Examples include a CAD module provided by an independent third party, or with the system of the invention, to provide, to the input module, data reflecting a design of an edifice to be serviced by the design of the HVAC system. Likewise, a load module may interact, being configured to receive outputs from the CAD module and provide, to the input module, HVAC loading parameters required to be met by the HVAC system design. Also, or instead, a vendor module may be provided by an independent vendor and configured to specify products available for sale and meeting the requirements to be the design elements.

The output module may be further configured to do at least one of several tasks. Tasks may include generating reports, drawing schematic illustrations, providing schedules of components, and providing performance analyses reflecting the design elements. The product module may also include a specification module configured to provide a detailed specification for an arbitrary number of selected design elements. The product module may have product data corresponding to products available from vendors to serve as the design elements. Also, the specification module may include a filter module configured to sort the products by features thereof and priorities of the features, each selectable by a user, in order to automatically specify detailed parameters characterizing a product selected by a user to serve as the selected design element.

The user interface may further include a selection module providing a palette of icons representing design elements selectable arbitrarily by a user and connectable to one another in a schematic work space to establish the HVAC system design.

A method for designing an HVAC system may include providing a database having records and configured to manage values of properties corresponding to design elements corresponding to substantially all physical components and connections available for creating an HVAC system design; providing a user interface configured to represent design elements arbitrarily selectable by a user and connectable to one another in a schematic to establish the HVAC system design; providing, automatically, default values corresponding to the properties corresponding to the design elements; selecting arbitrarily, from the design elements, by a user, an arbitrary number of selected design elements to be interconnected in the HVAC system design; selecting, by a user, a relative location and interconnections corresponding to each arbitrary design element; calculating, automatically, values of properties characterizing the arbitrary design elements; validating correctness of the interconnections and properties; calculating performance parameters corresponding to the HVAC system design; and providing drawings defining the HVAC system design for construction.

BRIEF DESCRIPTION OF THE DRAWINGS

The foregoing and other objects and features of the present invention will become more fully apparent from the following description, taken in conjunction with the accompanying drawings. Understanding that these drawings depict only typical embodiments of the invention and are, therefore, not to be considered limiting of its scope, the invention may be seen in additional specificity and detail in the accompanying drawings where.

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 21, is not intended to limit the scope of the invention, as claimed, but it is merely representative of certain presently preferred embodiments in accordance with the invention. These embodiments will be best understood by reference to the drawings, wherein like parts are designated by like numerals throughout.

Those of ordinary skill in the art will, of course, appreciate that various modifications to the details illustrated FIGS. 1–21 may easily be made without departing from the essential characteristics of the invention. Thus, the following description is intended only by way of example, and simply illustrates certain presently preferred embodiments consistent with the invention as claimed herein.

Figure 1:
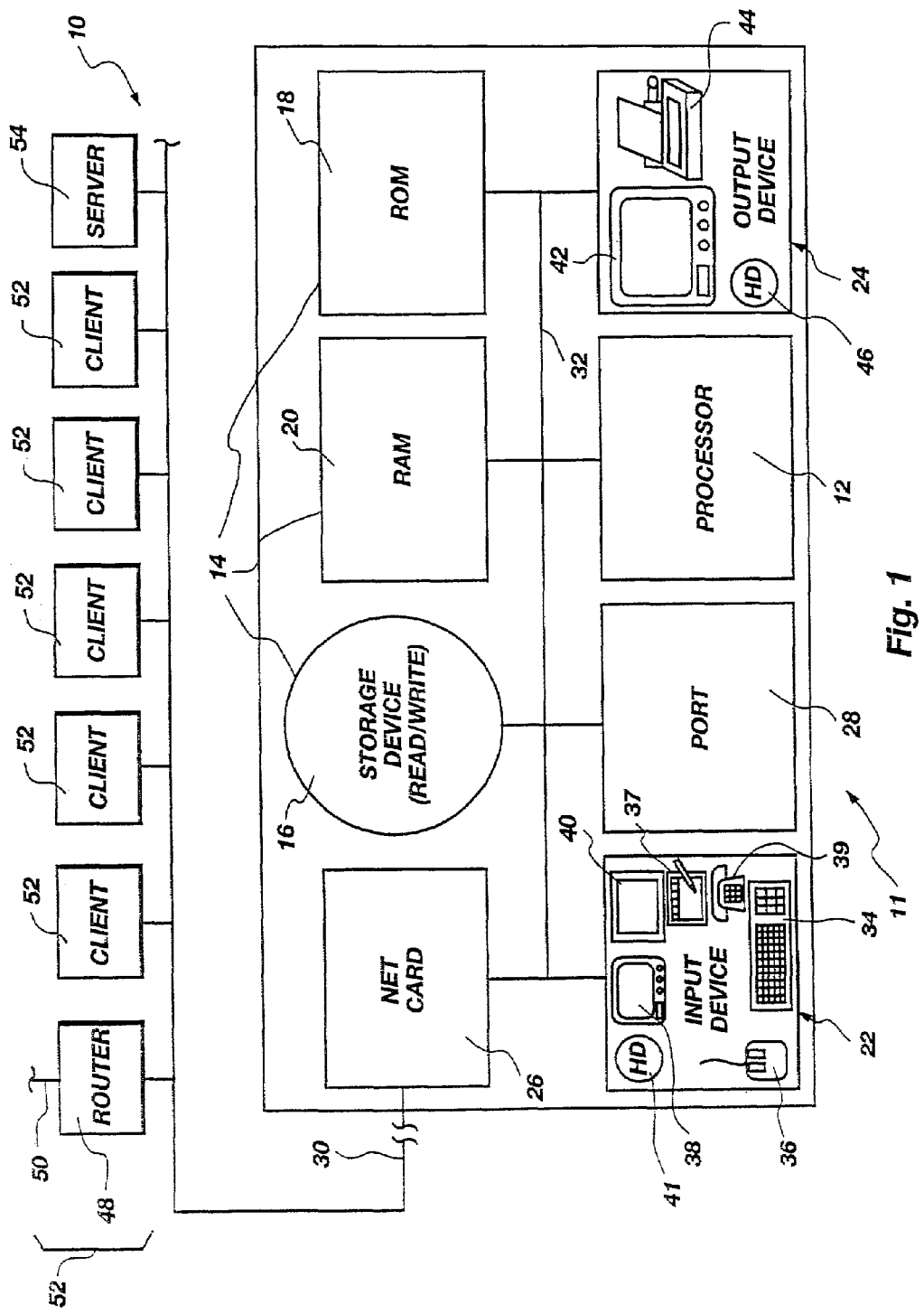
FIG. 1 is an illustration of a general purpose computer suitable for use in accordance with the present invention.

Referring now to FIG. 1, an apparatus 10 may include a node 11 (client 11, computer 11) containing a processor 12 or CPU 12. The CPU 12 may be operably connected to a memory device 14. A memory device 14 may include one or more devices such as a hard drive 16 or non-volatile storage device 16, a read-only memory 18 (ROM) and a random-access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 (system bus 32) may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like.

Similarly, a scanner 40 may be used to receive graphical inputs which may or may not be translated to other character formats. A hard drive 41 or other memory device 14 may be used as an input device whether resident within the node 11 or some other node 52 (e.g., 52a, 52b, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11,52 on an internetwork. The individual nodes 52 may have various communication capabilities.

In certain embodiments, a minimum of logical capability may be available in any node 52. Note that any of the individual nodes 52, regardless of trailing reference letters, may be referred to, as may all together, as a node 52 or nodes 52.

A network 30 may include one or more servers 54. Servers may be used to manage, store, communicate, transfer, access, update, and the like, any number of files for a network 30. Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection (e.g. Internet) with some remote node 52. Likewise, individual components of the apparatus 10 may need to communicate data with one another. A communication link may exist, in general, between any pair of devices or components.

By the expression "nodes" 52 is meant any one or all of the nodes 48, 52, 54, 56, 58, 60, 62, 11. Thus, any one of the nodes 52 may include any or all of the component parts illustrated in the node 11.

To support distributed processing, or access, a directory services node 60 may provide directory services as known in the art. Accordingly, a directory services node 60 may host software and data structures required for providing directory services to the nodes 52 in the network 30 and may do so for other nodes 52 in other networks 50.

The directory services node 60 may typically be a server 54 in a network. However, it may be installed in any node 52. To support directory services, a directory services node 52 may typically include a network card 26 for connecting to the network 30, a processor 12 for processing software commands in the directory services executables, a memory device 20 for operational memory as well as a non-volatile storage device 16 such as a hard drive 16. Typically, an input device 22 and an output device 24 are provided for user interaction with the directory services node 60.

Figure 2:
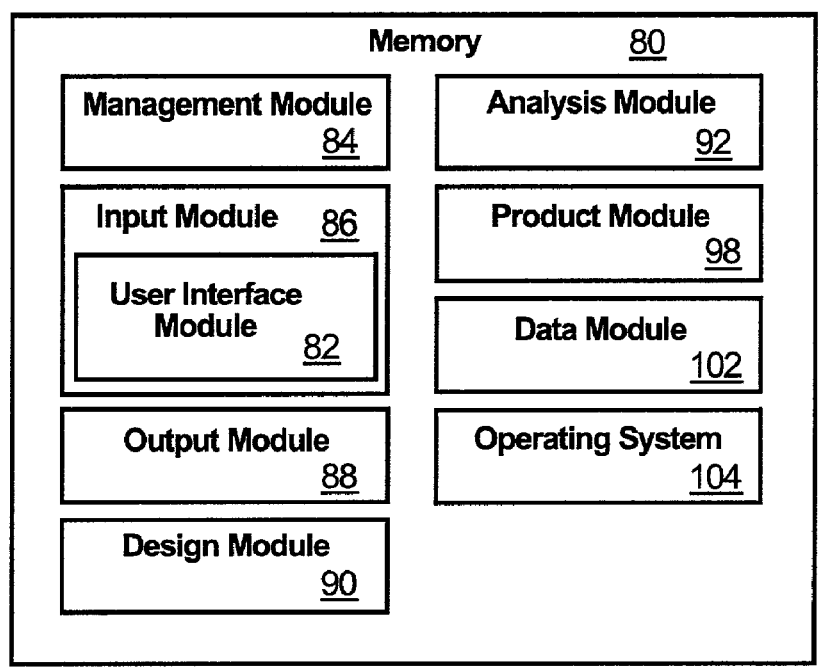
FIG. 2 is a schematic block diagram of data structures suitable for implementing at least one embodiment of an apparatus and method in accordance with the invention.

Referring to FIG. 2, a memory device 14 or memory devices 14 may store executable and operational data (e.g. data structures) in accordance with the invention. The memory device 14 or memory devices 14 may store a management module 84, an input module 86, an output module 88, a design module 90, an analysis module 92, a product module 98 and a data module 102. The memory device 14 or memory devices 14 may also store an operating system 104. An input module may include a user interface module 82, or the user interface module 82 may be a separate module.

Every module in accordance with the invention, may be anything from a single machine-level instruction, to an entire multimedia application. That is, an individual module 82, 84, 86, 88, 90, 92, 94, 96, 98 and 102, including all submodules thereof, can physically be stored in any size, shape, configuration, on any number of computers, in order to execute its function. Thus the management module 84 is typically that code that is logically executed to control the execution of the other modules 82, 84, 86, 88, 90, 92, 94, 96, 98, 102 and effect the communication of data therebetween.

Figure 3:
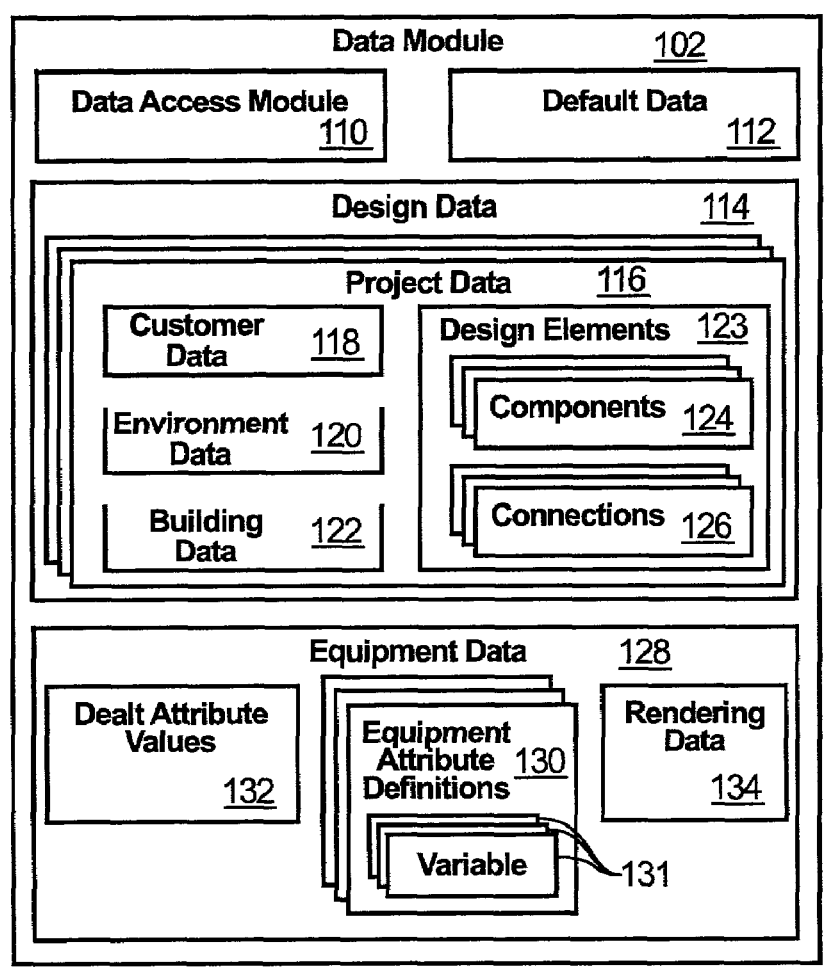
FIG. 3 is a schematic block diagram of data structures suitable for implementing a data module.

Referring to FIG. 3, a data module 102 may store data suitable for describing designs or elements of a design. A data module 102 typically includes a data access module for enabling other modules 82, 84, 86, 88, 90, 92, 94, 96 and 98 to access the data contained therein.

The default data 112 is typically data that can be used for parameters used to describe the design of an HVAC system. For example, default data 112 may include acceptable values for the outlet temperature of a boiler. One utility of default data 112 is that a user is not required to research or calculate values which are already known in the HVAC arts, but rather, can rely on these data being readily available. Default data 112 may be static stored values or may be calculated based on the design data 114.

A data module 102 may include design data 114. Design data 114 typically contains data describing a design or designs created by a user. Typically the design data 114 consists of one or more sets of project data 116 or projects 116. The project data 116 may include customer data 118, environment data 120, building data 122, components 124 and connections 126. For example, customer data 118 may comprise the name of the customer for which a project was made, contact information, or the like. Environment data 120 may include information describing the physical location where the actual HVAC system being designed will be built. This information may include the outside temperature of the air during the heating season and the cooling season, the elevation, and the relative humidity.

Environment data 120 may also include the wet bulb and dry bulb temperatures during both the cooling season and the heating season, and the enthalpy of the air during the cooling season and the heating season. Building data 122 may include the rate of heat loss, the number of people normally in the building, the air flow requirements, the size of internal spaces, and the like.

The design elements 123 are records describing the properties of the equipment to be placed in an actual implementation of an HVAC system. Design elements 123 may be records such as component records 124 or components 126 and connection records or connections 126. The design elements 123 of the project data 116 are all of the data describing equipment placed in the design by the user as well as descriptions of the spaces to be serviced by the HVAC system being designed.

The equipment that may be placed in a project may include all equipment that can be used in any actual HVAC system. The components 124 typically include descriptions of equipment that affect the fluids flowing through an HVAC system.

The connections 126 typically include descriptions of pipes and ducts connecting equipment in an HVAC system design. The connections 126 may describe which piece of equipment is connected to which other piece of equipment as well as a description of the connecting fasteners, coupling pipe, duct, or the like. A connection 126 may also include data describing any head loss in a connecting piper or duct such as frictional losses, fitting losses, elevation changes or the like. A connection 126 may describe the appearance of the connecting piper or duct in a schematic such as its location on a computer screen and its shape.

The equipment data 128 may provide data describing components 124 and connections 126 that a user can place in a design. The equipment data 128 may include equipment attribute definitions 130. The equipment attribute definitions 130 may include a definition of properties 131 that can be used to describe a physical embodiment of a design element. Properties 131 may comprise data structures storing any suitable data, such as text, numerical data, and the like.

Equipment attribute definitions 130 may also include definitions of equipment suitable for use in HVAC systems such as pumps, air separators, expansion tanks, air cooled chillers, water cooled chillers, cooling towers, cooling tower sumps, boilers, heat exchangers, air handlers, plenums, fans, louvers, roof hoods, dampers, coils, filters, radiant objects, fan coils, terminal boxes, unit heaters, pipe tees, duct tees, pipes, ducts, and the like. Components 124 and connections 126 may comprise values corresponding to the properties 131 defined in the equipment attribute definitions. For example a component 124 that represents a pump will contain values for the properties 131 defined in the equipment attribute definition 130 for a pump.

Rendering data 134 may include graphical data associated with a particular equipment attribute definition. For example boilers will have a schematic representation that will be used by the user interface module 82 to draw them on a computer screen. An output module 88 may likewise render a graphical description of a design to an output device 24.

Many different graphical representations may correspond to an equipment attribute definition 130. For example, each type of fan may have its own corresponding graphical representation. An equipment attribute definition 130 may also have various graphical representations mapped to different values of its properties 131. For example, design elements 123 may have a property indicating the manufacturer or model of a piece of equipment.

The rendering data 134 may, accordingly, contain graphical descriptions corresponding to the manufacturer or model of that design element. Rendering data 134 may also include different graphical representations of an equipment attribute definition 130 corresponding to the property 131 or properties 131 describing the type of fluid passing through it.

For example, the graphical representation of a fan that forces air through an air handler may be a different color than a fan that draws air from a space and exhausts it to the outside. Likewise, the equipment attribute definition 130 of a connection 126 may have a variety of graphical representations corresponding to a component 126 or components 126 connected to or characteristics of the fluid it carries.

Figure 4:
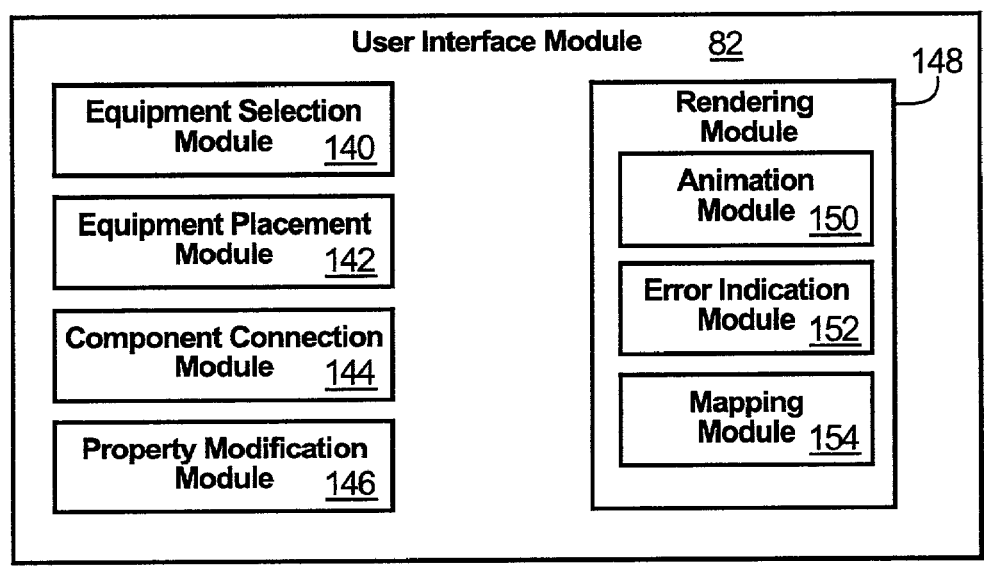
FIG. 4 is a schematic block diagram of data structures suitable for implementing a user interface module in accordance with the invention.

Referring to FIG. 4, a user interface module 82 is typically responsible for handling user interface events such as mouse clicks, keystrokes, or the like and rendering user interface elements on a computer screen. A user interface module 80 may include an equipment selection module 142, a component connection module 144, a property modification module 146, and a rendering module 148.

Figure 5:
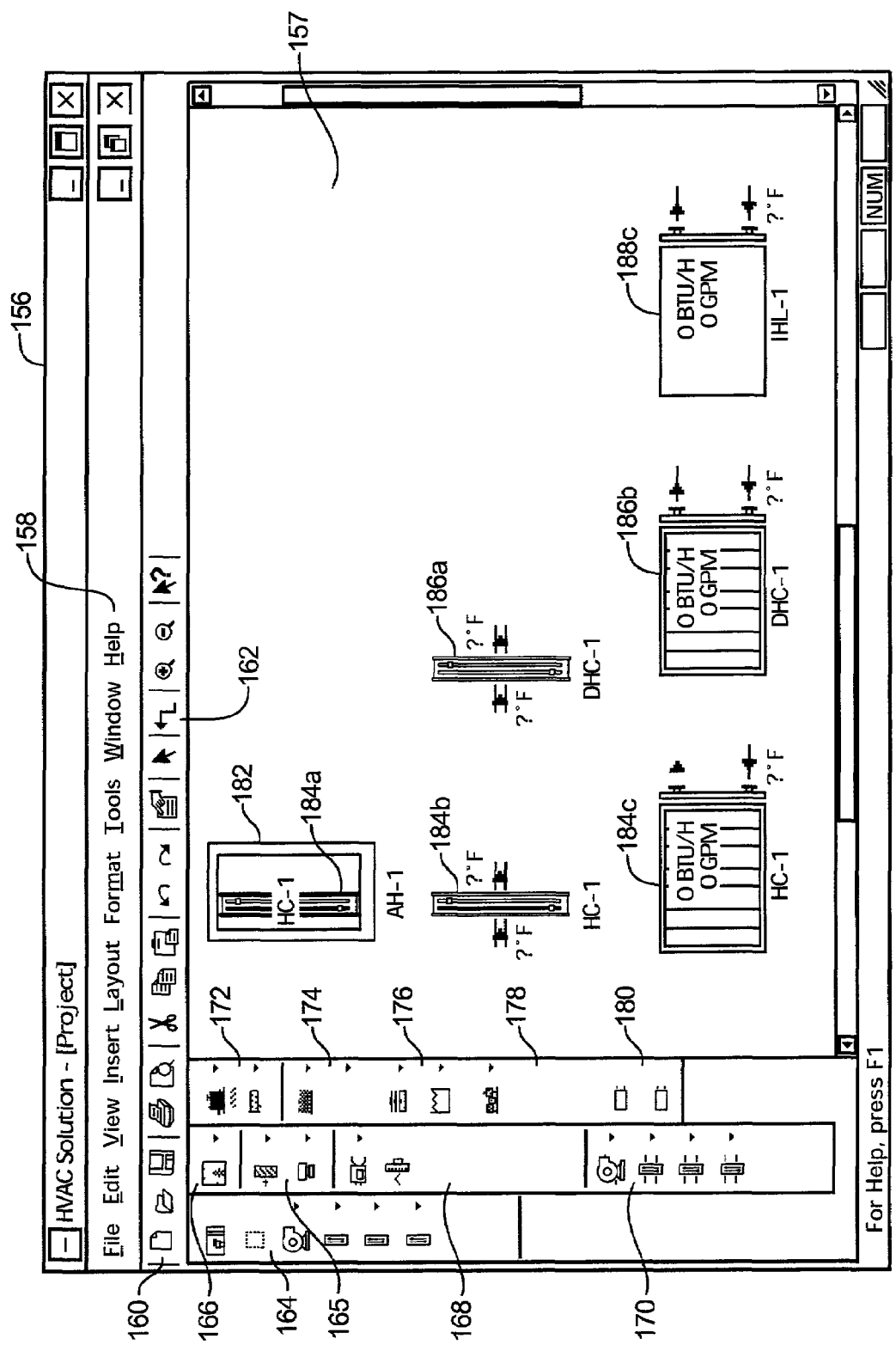
FIG. 5 is an illustration of a user interface in accordance with the invention showing different schematic representations of a design element.

Referring to FIG. 5, while continuing to refer to FIG. 4, a user interface module 82 may present a user with a window 156. A window 156 may include a menu bar 158, a tool bar 160, and a variety of palettes 164, 165, 166, 168, 170, 172, 174, 176, 178, 180. A window 156 may include a region 157 for displaying a graphical representation of a project 116.

An equipment selection module 140 may enable a user to select a type of component and place a design element in a project 116. In a typical embodiment the equipment selection module 140 may present a user with palettes 164, 165, 166, 168, 170, 172, 174, 176, 178, 180 containing icons representing design element types to choose from. A user may click in a palette 164, 165, 166, 168, 170, 172, 174, 176, 178, 180 in order to choose a type of design element to place in a schematic or to select for inclusion in a design. An equipment placement module 142 may then enable a user to click in a region 157, thereby placing a design element 123 in a project 116.

The equipment selection module 140 may arrange the palettes 164, 165, 166, 168, 170, 172, 174, 176, 178, 180 in groups on a computer screen. For example, a palette 164 may present schematic representations of components suitable for placement in an air handler schematic. Palettes 166, 165, 168 and 170 may be grouped together and present components suitable for placement in an air flow schematic. Palettes 172, 174, 176, 178 and 180 may be grouped together and include schematic representations of components suitable for placement in a hydronic schematic.

A user may also be presented with a connection tool 162, which may be embodied as an icon 162. A user may click on the icon 162 and then click on various design elements in order to connect them.

In one embodiment of the present invention, a user may be presented with a palette 166, which a user may click and then click in region 157 in order to place a component 124 corresponding to a space in a project 116. The space may represent a room or any other interior region of a structure to be served by an HVAC system.

In one embodiment of an apparatus and method in accordance with the present invention, a user may select a component type and place a component 124 of that type in a project 116. A user may then click in a region 157 and place a different schematic representation of that same component 124 without having to click again on that element or selection on the palette 164, 165, 166, 168, 170, 172, 174, 176, 178, 180.

For example, a user may click on a palette 164 and select an entry or element such as a heating coil. A user may then click on a schematic representation 182 of an air handler and place the air handler's schematic representation of a heating coil 184a in the air handler 182. A user may then click in the region 157 and place an air flow schematic representation of the heating coil 184b in an air flow schematic. The user may then click again in the region 157 and place a hydronic schematic representation of a heating coil 184c in a hydronic schematic.

In one embodiment, various schematic representations may represent different operational contexts. The operational contexts may represent the transport of mass, energy, or the like. For example a hydronic schematic may present design elements in the operational context of the effect they have on the volume of working fluid flowing through a system as well as the energy they extract or add to the working fluid. By contrast, an air flow schematic may represent a operational context wherein design elements 123 are analyzed according to their effect on the properties of the air flowing through an HVAC system.

A user may not need to be limited to placing every possible schematic representation of a component 124 in a project 116. For example, a user may select a heating coil from a palette 170 and place an air flow schematic representation of a heating coil 186a in the region 157, a user may then automatically place a hydronic representation 186b of the heating coil in a hydronic schematic. As another example a user may choose to merely place a heat load 188 (a hydronic equivalent to a heating coil) in a hydronic schematic without placing any other corresponding schematic representations thereof in the design.

Figure 6:
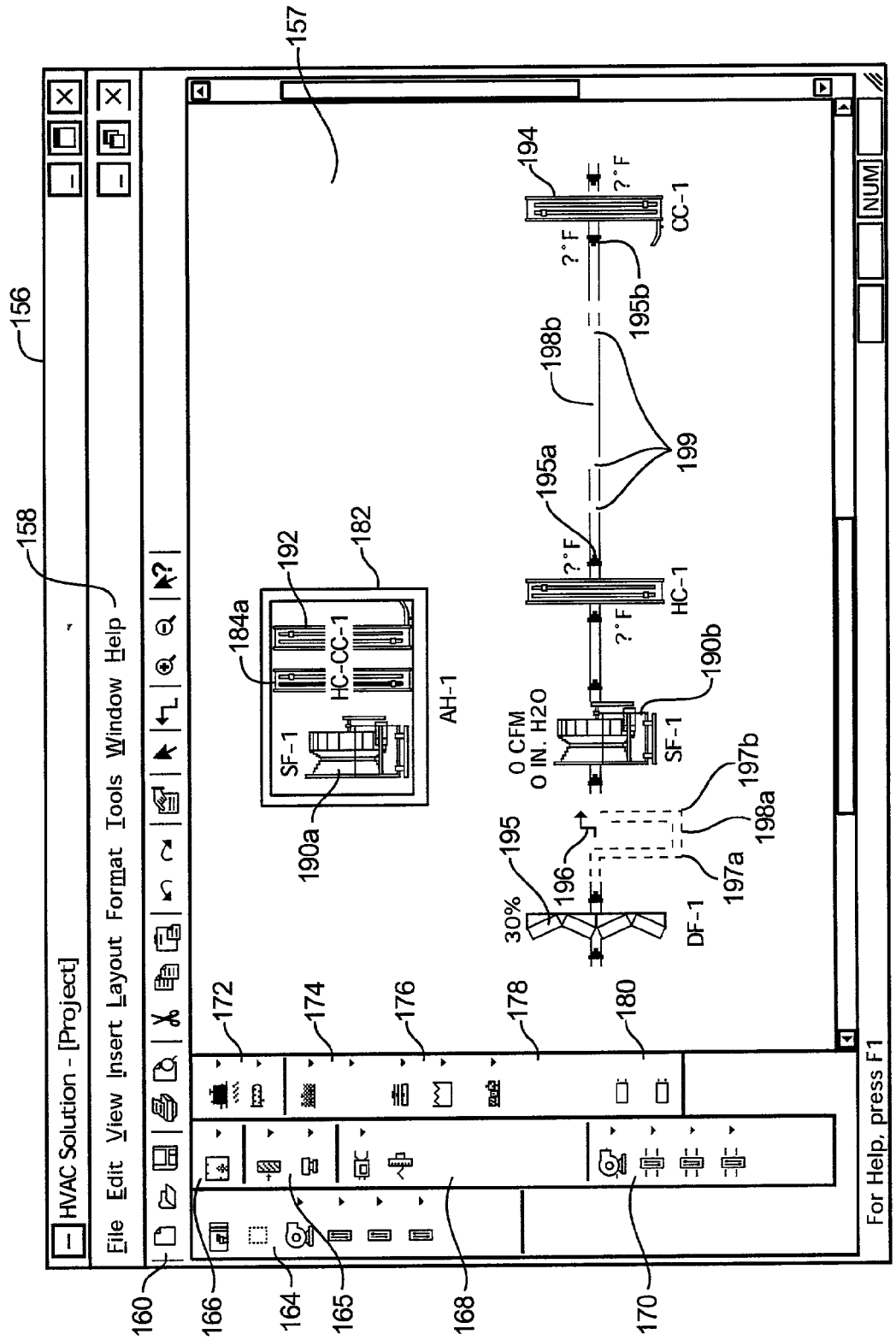
FIG. 6 is an illustration of a user interface in accordance with the invention showing features of the connections between design elements.

Referring to FIG. 6, while continuing to refer to FIG. 4, a component connection module 144 may connect components 124. For example a user may click on a damper 195, click at various places 197a, 197b in region 157, and then click on a fan 190b. A user may click in region 157 in order to create corners 197a, 197b in a connector 198a. When a user connects any two components in one schematic representation of a project 116, the two pieces of equipment will be automatically connected in other schematic representations of the project 116. For example, if a user were to connect fan 190b to heating coil 184b, then, a connection 126 would automatically connect fan 190a to heating coil 184a in the air handler 182.

Figure 7:
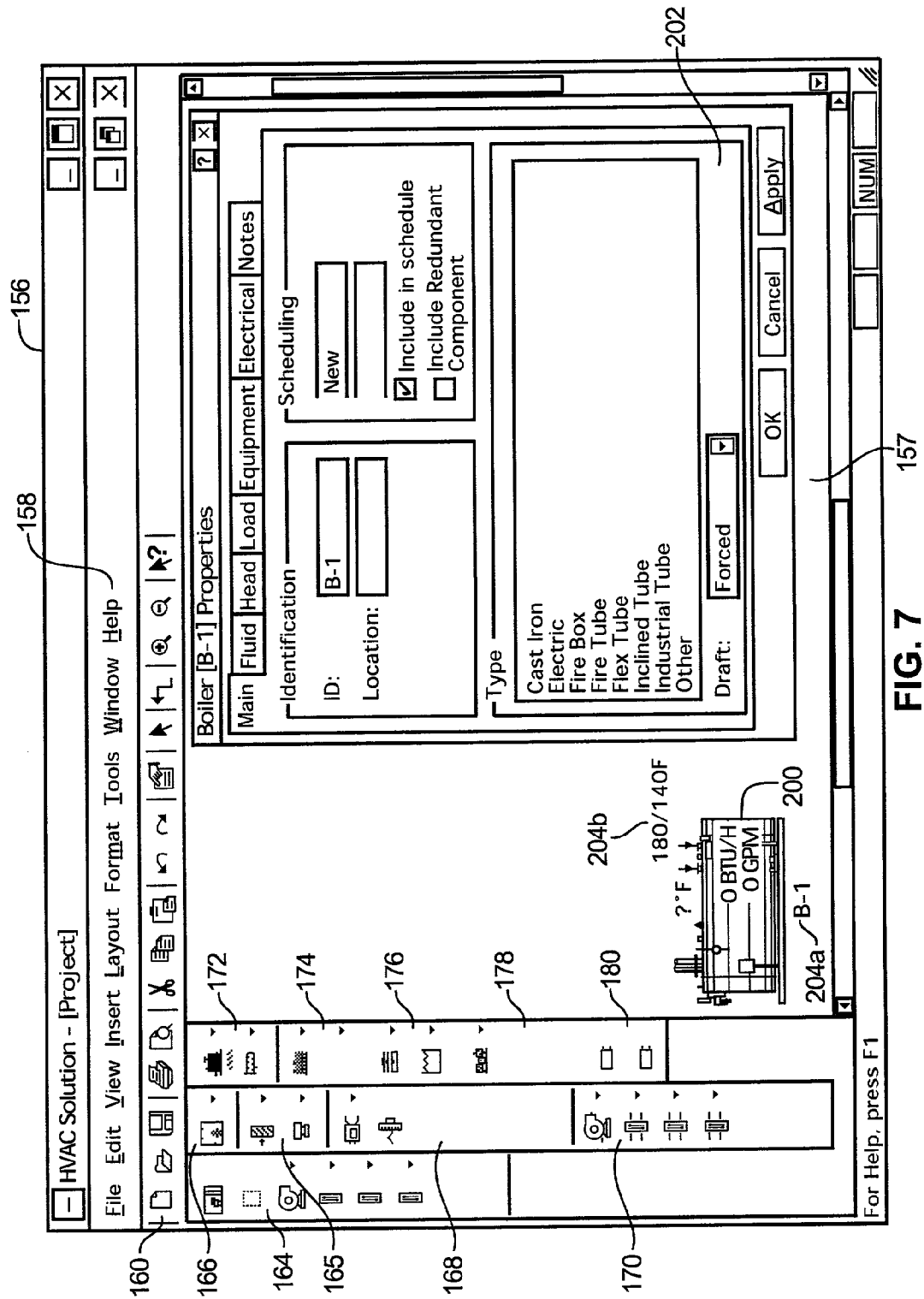
FIG. 7 is an illustration of a user interface in accordance with the invention showing the modification of the properties of a design element.

Referring to FIG. 7, while continuing to refer to FIG. 4, a property modification module may enable a user to modify the properties 131 of a design element. For example a user may click on a graphical representation 200 of a design element 123, such as a boiler 200 and be presented with a dialog box 202 or other interface 202 for inputting information. A user may then view and modify the values of the properties 131 describing a design element 123.

When a user modifies the values of the properties 131 of one schematic representation of a component 124 or connection 126 the values of the properties 131 describing other representations of the component 124 or connection 126 will automatically be modified as well. For example if the heating coil 184c (FIG. 5) were to be modified in some way, then the heating coils 184a, 184b will automatically be modified as well.

Referring again to FIG. 4, a rendering module 148 may render graphical representations of design elements 123 to an output device 24. The rendering module 148 may also render two dimensional and three dimensional drawings of an HVAC system or a portion thereof. A rendering module 148 may include an animation module 150, an error module 152 and a mapping module 154. An animation module 150 may provide a mechanism to visually simulate the flow of fluid through an HVAC system. For example a user is able to see a simulation of fluid flowing through the various components of the system. One utility of this is to enable a user to visually verify that the system now designed will function as it was designed to function.

An error module 152 may provide a means to visually indicate errors in an HVAC system design. For example, in FIG. 6, the heating coil 184b is connected to a cooling coil 194. However the arrow 195a is pointed in a direction opposite to the direction of the arrow 195b. This indicates that the outlet of the heating coil 184a, 184b is connected to the outlet of the heating coil 194. Because this is an unacceptable design, the connector 198b is shown with breaks 199 in line density to visually indicate the error.

Figure 8:
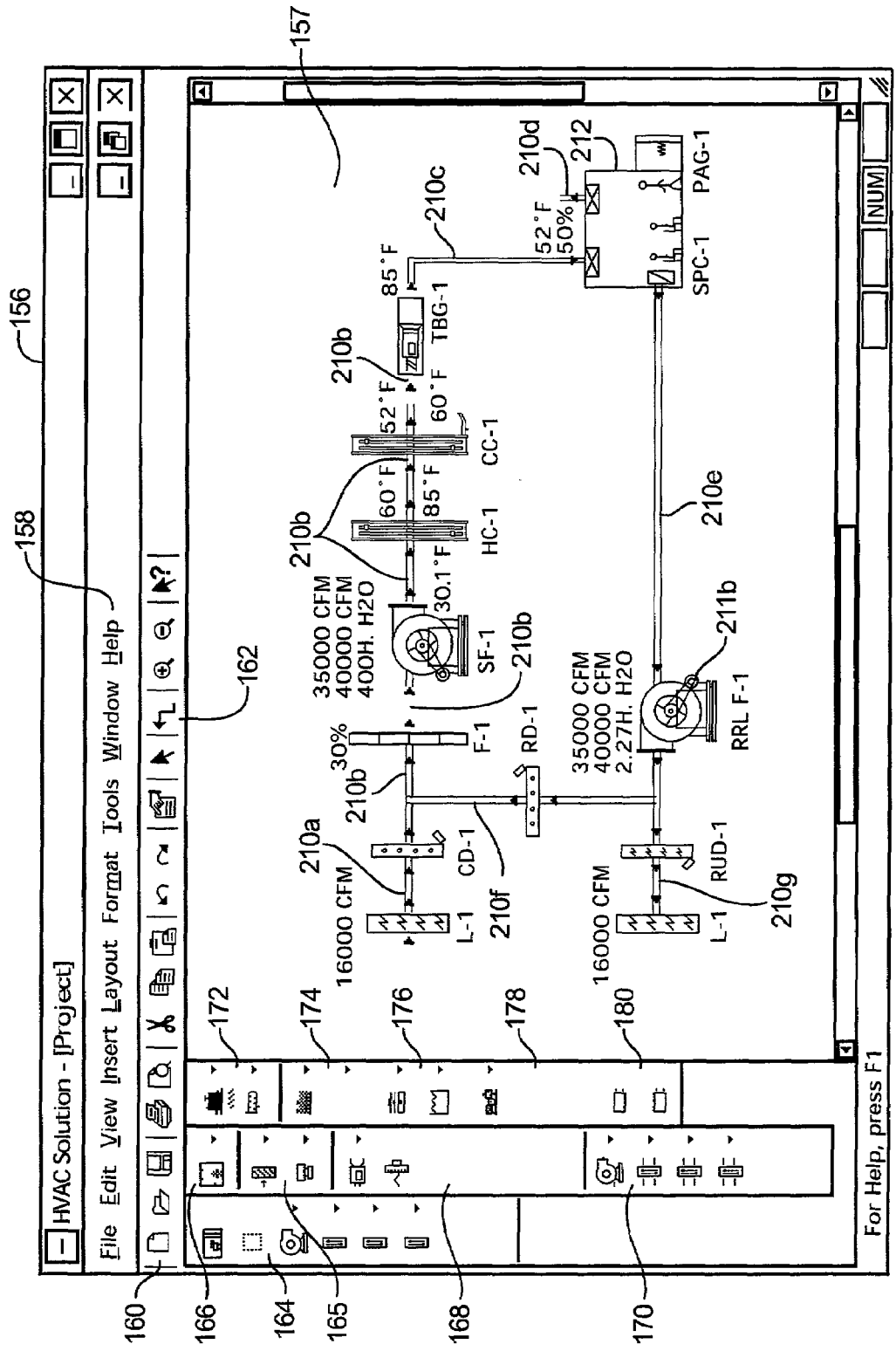
FIG. 8 is an illustration of a user interface in accordance with the invention showing novel features of the connections between design elements.

Referring to FIG. 8, while continuing to refer to FIG. 4, a mapping module 154 may provide for drawing the graphical representation of a piece of equipment mapped to the values of the properties 131 describing it. For example, the color that a connector is drawn with may be mapped to characteristics of the fluid that is passing through it. For example, a connector 210a may be colored one color because it carries air from outside of the system. The connectors 210b and 210c may be colored a different color because they carry air entering the conditioned space 212. Connectors 210d and 210g may have a distinct color corresponding to air vented to the outside environment. A connector 210e may have a distinct color corresponding to air that is being returned to the air handler and relieved to the outside. A connector 210f may have a distinct color indicating that it carries air that is to be recirculated through an air handler.

Any piece of equipment may be mapped to multiple graphical representations depending on the values of its properties 131. For example, a fan 211a inside an air handler may be rendered differently than an otherwise identical fan 211b handling air being returned to an air handler or relieved to the outside of a system.

Figure 9:
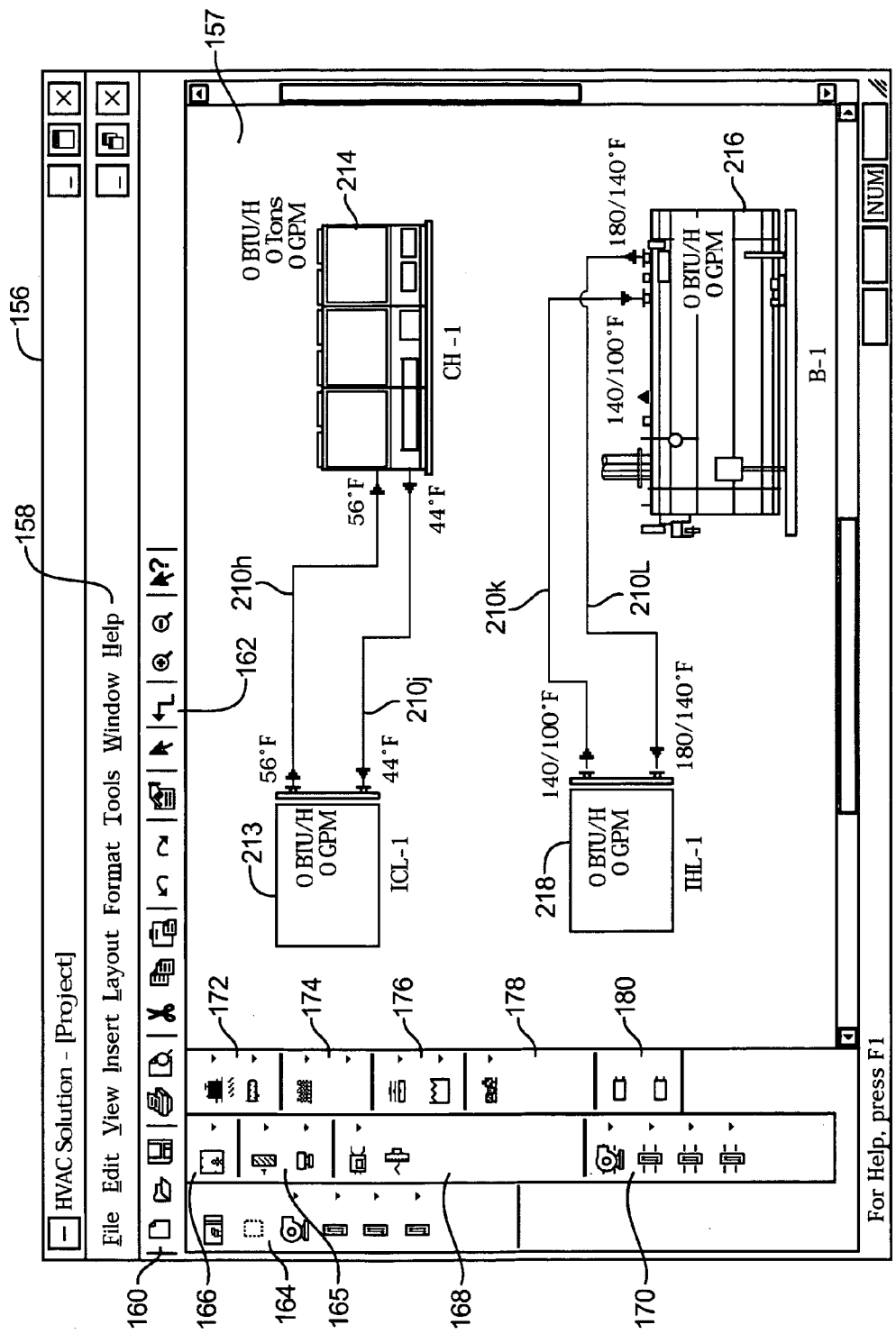
FIG. 9 is an illustration of a user interface in accordance with the invention showing novel features of the connections between design elements.

FIG. 9 illustrates another example of how the graphical representation of a piece of equipment may depend on the values of its variables. For example, a connector 210h connecting the outlet of a cooling load 213 to the inlet of a chiller 214 may be rendered in a color indicating that it is at a higher temperature than the fluid flowing through the connector 210j, which carries fluid from the outlet of the chiller 214 to the inlet of the cooling load 213. The color of connectors 210h and 210j may both be different from the colors used for connectors 210k and 210l used to connect a boiler 216 to a heating load 218 (e.g. heating or cooling), providing a visual indication that connectors 210h and 210j are being used to connect cooling components and that connectors 210k and 210l are used to connect components of a heating system.

The mapping module 154 may also render a graphical description of a design element 123 mapped to the design elements 123 to which it is connected. For example connectors 126 carrying different fluid having different characteristics may both be connected to a tee having a third connector 126 leaving the tee. The connector 126 carrying fluid away from the tee may be rendered in a different color indicating it carries a mixture of the fluid entering the tee.

Figure 10:
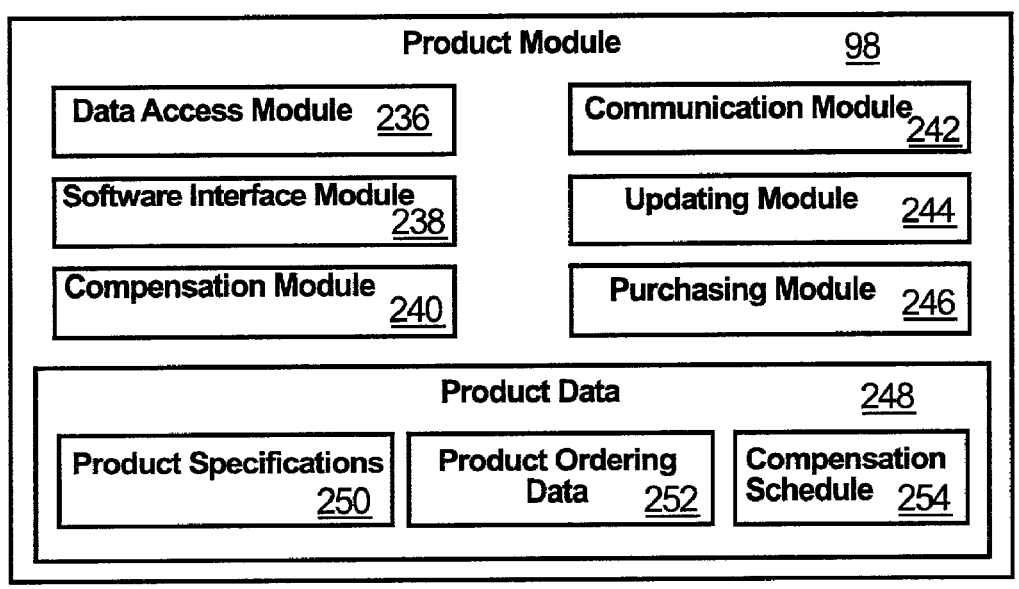
FIG. 10 is a schematic block diagram of data structures suitable for implementing a product module in accordance with the invention.

Referring to FIG. 10, a product module 98 may provide a mechanism for a user to access data describing actual manufactured equipment that may be purchased in order to build an actual HVAC system design. This data may include sets of values which the properties 131 of a design element may assume. Through this process, a design may be analyzed based on representations of equipment that reflect more closely what the actual physical embodiment of a design will be like. A product module 98 may include a data access module 236, a software interface module 238, a compensation module 240, a communication module 242, an updating module 244, a purchasing module 246, and product data 248.

The data access module 236 may enable a user to access the product data 248. The data access module 236 may enable a user to choose from a list of products described in the product data 248. Upon choosing a product, the set of properties 131 of a component 124 or connection 126 may assume values corresponding to those characterizing to the product. For example, a component 124 representing a pump may assume values for its properties 131 corresponding to measured values of an actual manufactured pump. A data access module 236 may also enable other modules 82, 84, 86, 88, 90, 92, 94, 96, 98, 102 to access the data stored in the product module 98.

A software interface module 238 may interface with software provided by vendors of manufactured products. Vendors of equipment suitable for use in HVAC systems may provide software that will enable a user to more easily select a manufactured product based on the requirements of the HVAC system being designed and built by the user. A software interface module 238 may enable a user to transfer data between an apparatus 10 and software provided by a vendor.

One utility of this is that a user is not required to manually enter data into the vendor software and then manually enter any output data into an apparatus 10. For example, a manufacturer of pumps may provide a software package into a which a user may enter a flow rate needed and the rise in pressure that a pump needs to provide. The software may then output the specifications of an actual pump that most closely matches the needs originally input into the software.

A software interface module 238 may enable a user to specify which vendor software package to use and then automatically calculate the values of the properties 131 for a design element corresponding to actual manufactured equipment and optimally satisfying the requirements of the design. A software interface module 238 may then automatically set the values of the properties 131 of a design element to those corresponding to the actual equipment.

A compensation module 240 may enable a provider of an apparatus 10 or any of the modules 82, 84, 86, 88, 90, 92, 94, 96, 98, 102 thereof to be compensated for providing a mechanism for a user to access data concerning actual manufactured products. The compensation module 240 may notify a manufacturer or supplier of a piece of equipment when a user selects a piece of equipment sold by the manufacturer for incorporation into a design.

For example, if a user specifies that a design element 123 in a project 116 may assume values for its properties 131 corresponding to a physical design element manufactured by a manufacturer X, then the manufacturer X may be so notified, via a network 30 or other communication means. A provider of the apparatus 10 (e.g. system 10, application 10) or any of the modules 82, 84, 86, 88, 90, 92, 94, 96, 98, 102 thereof may receive a sales commission for aiding in the advertisement and sale of the design element.

A compensation module may contact a manufacturer or supplier of a product automatically via a communication module 242 to place an inquiry, request for quote, or order. A provider of the system 10 or any of the modules 82, 84, 86, 88, 90, 92, 94, 96, 98, 102 may also be automatically informed concerning selections that take place.

A compensation module 240 may make use of a compensation schedule 254. The compensation schedule 254 may provide data concerning how much compensation a provider of an apparatus 10 or any of the modules 82, 84, 86, 88, 90, 92, 94, 96, 98, 102 thereof shall be entitled too in the event that a user chooses to incorporate a particular product into a design.

A communication module 242 may facilitate communication between an apparatus 10 (e.g. application 10 on a computer 11) and other nodes 52 by means of a network 30. A communication module 242 may function in conjunction with an updating module 244 and product specifications 250. A communication module 242 may permit an updating module 10 to communicate across a network 30 with manufacturers of equipment in order to obtain current information concerning available products. This may include obtaining information concerning the specifications of new products, changes to the specifications of products, and the like.

The updating module 244 may then store the information obtained in the product specifications 250. The updating module 244 may obtain the information concerning products from any input device 22. For example an updating module 244 may read data from a compact disk (CD) or any other computer readable medium provided by a manufacturer. The product specifications 250 may be embodied as records describing values for the properties 131 of products that are available for use in actual implementations of HVAC systems.

An updating module 244 may likewise obtain current data for storage in a compensation schedule 254 or product ordering data 250. A communication module 242 may also enable a user to contact a manufacturer or supplier of a product, without requiring that the user supply contact information, such as an electronic mail address or the like.

A purchasing module 246 may function in conjunction with a communication module 242 and product ordering data 252 to enable a user to automatically order equipment from a supplier of equipment. The purchasing module 246 may gather data concerning a project 116 and compile a lists of equipment that will need to be purchased in order to implement a project 116. The data gathered may summarize the properties of the design elements 123, such as the number and manufacturer of each type of design element.

For example, the purchasing module may compile a list containing the number of pumps that will need to be bought from a particular vendor, as well as the number of other design elements to be bought. Product ordering data may provide information facilitating the ordering of equipment such as information needed to contact a vendor over a network 30. A communication module 242 may permit a purchasing module 246 to automatically contact suppliers of equipment over a network 30 in order to arrange for the purchase of equipment for use in a physical implementation of a project 116.

Figure 11:
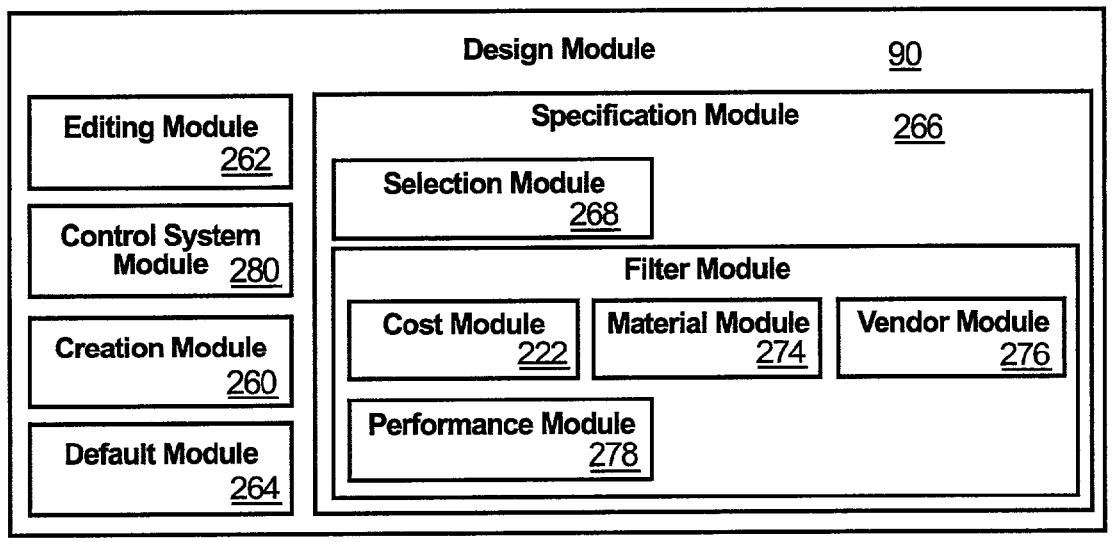
FIG. 11 is a schematic block diagram of data structures suitable for implementing a design module in accordance with the invention.

Referring to FIG. 11, a design module 90 may include a creation module 260, an editing module 262, a default module 264, and a specification module 266. A creation module may function in conjunction with the equipment placement module 142 of the user interface module 82 such that when a user places a piece of equipment in a region 157, a corresponding component 124 is stored with project data 116. Likewise, the creation module may create a connection record when a user connects components 124 using the component connection module 144 of the user interface module 82.

In certain embodiments of the invention supporting the placement of multiple schematic representations of the same design element 123, a creation module 260 may store distinct design elements 123 corresponding to each schematic representation of the design element. The creation module 260 may also store design elements 123 containing only sufficient data to link one design element 123 to another design element 123 actually corresponding to another schematic representation of the same hardware design element 123.

For example, a heating coil placed in an air handler schematic may have a component record 124 stored in a project 116. The airflow schematic representation of the same heating coil may be stored as a component record 124 that merely contains data identifying the component record 124 storing the air handler schematic representation. Alternatively a creation module 260 may store a single design element 123 containing all the properties 131 of all schematic representations of such a design element 123.

The editing module 262 may work in conjunction with a property modification module 146 such that a user may edit the values of the properties 131 of a design element 123. The editing module 262 may automatically make corresponding changes to design elements 123 corresponding to other schematic representations of the design element 123 edited.

A default module 264 may automatically provide values for design data 114, so a user is spared the time and bother of filling in values for which acceptable values may be catalogued, calculated otherwise easily known and do not vary greatly from one project 116 to another project 116. For example, it is common for boilers to have the same outlet fluid temperature. The default module may use the data access module 110 of the data module 102 in order to access default attribute values 132 in order to obtain default values for the properties 131 of a design element 123.

The default module 264 may, in some embodiments, supply default values for the properties 131 of a design element 123 based solely on values stored within the default attribute values 132. Alternatively, or in addition, the default module 264 may also automatically calculate certain default values based on other design data 114, such as the environment data 120 of a project or the values of the properties 131 of other components 124 and connections 126 in a project 116.

A default module 264 may also provide a mechanism (e.g. code, tables, calculations, etc.) to specify default values for all equipment or for equipment of a specific type. For example, a user may specify that all pumps have a particular or standardized efficiency, thereby sparing a user the bother of manually changing this property 131 to synchronize the performance or requirements for every pump in a project 116.

A specification module 266 may enable a user to incorporate the known values for properties 131 of actual manufactured products into a project 116. The specification module 266 may enable a user to set the values of the properties 131 of a component 124 or connection 126 to those corresponding to an actual manufactured product. A selection module 268 may enable a user to select from a list of possible products.

For example, a user may be presented with a list of products. A user may click on an item in the list in order to indicate that a design element 123 shall assume values of properties 131 corresponding to an actual product.

The selection module may function in conjunction with a filter module 270 to enable a user to more easily select an ideal product for use in a project 116. A filter module 270 may include a cost module enabling a user to be selectively presented a list of available products sorted by cost. The cost module may also enable selective presentation of only those products that fall within a certain range of prices.

A material module 274 may enable a user to be selectively presented only those products made of a specific material. For example, by sorting and filtering, a user may specify a request to be presented only with those products made of brass or copper.

A vendor module 276 may selectively present to a user only those products supplied by a particular vendor. A performance module 278 may provide to a user a selectively presented set of products that satisfy certain performance requirements or fall within a range of performance requirements. A performance module 278 may also enable a user to specify that the selection module present lists of products sorted based on one or more performance criteria. The criteria used to choose products may include, for example, energy usage, power requirements, efficiency, length of service life, and the like.

Figure 12:
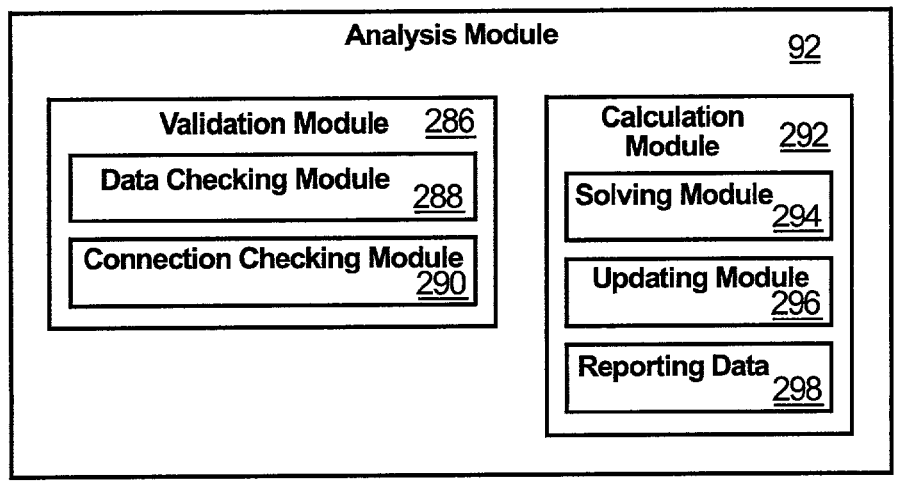
FIG. 12 is a schematic block diagram of data structures suitable for implementing an analysis module in accordance with the invention.
Figure 13:
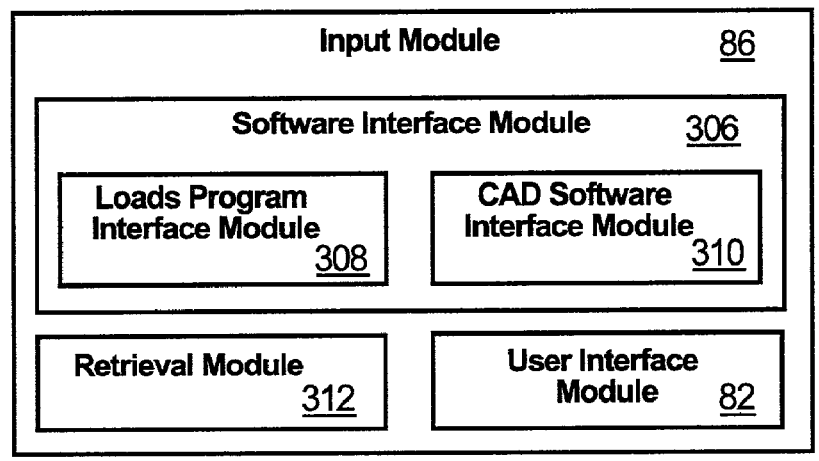
FIG. 13 is a schematic block diagram of data structures suitable for implementing an input module in accordance with the invention.

Referring to FIG. 12, an analysis module 92 may include various executables, such as, for example, a validation module 286 and a calculation module 292. The validation module 286 may analyze the design data to determine unacceptable configurations or parameters. The connection checking module 290 may analyze the connections between components and provide feedback to the user indicating unacceptable connections. Unacceptable connections may include, for example, connecting the outlet of one component 124 to the outlet of another component 124. The connection checking module may function in conjunction with the error indication module 152 (FIG. 4) to visually indicate errors on a computer screen or other output device 24. For example, in FIG. 6, the breaks 199 in a connector 198b indicate that the outlet of a heating coil 184b is connected to the outlet of heating coil 194.

A data checking module 288 may indicate that the values of certain design parameters are unacceptable. Design parameters that may assume unacceptable values may include project data such as the properties 131 of components 124 or connections 126. Environment data 120, customer data 118, building data 122 and any other design data 114 may be checked by the data checking module 288 in order to verify that all data is consistent and reasonable. Unacceptable parameters may be those that are inconsistent with one another or that are physically improbable or impossible.

The calculation module 292 may analyze the components 124 and connections 126 along with other design data 114 in order to calculate certain design parameters. The solving module 294 may solve for parameters based on other parameters of the system. For example, the solving module 294 may calculate the energy input of a boiler based on the heat extracted from the working fluid by other components 124 and lost by connectors 126. The solving module 294 may solve, for example, for the air flow that an air handler must provide to a design based on the air flow requirements of all of the spaces in the design.

The updating module 296 may update the variables of components 124 or connections 126 that are affected when a user inserts new components 124 or connections 126 into a design. The updating module 296 may also update any design data 114 affected by modifications to the design data 114. For example the updating module may update the air flow through an air handler when a space component record 124 is added to a project 116a, 116b. The updating module may also, for example, change the property 131 corresponding to an output, such as the heat output of a boiler, when the property 131 of a driving parameter, such as a heating load, corresponding to heat extracted from the working fluid, is changed.

The reporting module 298 may analyze the design data 114 to generate reports summarizing important aspects of a system. For example the reporting module 298 may generate a list of all power-consuming equipment in a project 116 and calculate the overall power consumption of a project 116. The reporting module may also generate lists (e.g. schedules) summarizing all of the equipment that a project 116 contains.

An input module 86 may enable an apparatus 10 to input data from input devices 22. In one embodiment an input module 86 may include a user interface module 82. In such an embodiment, some or all input from input devices 22 may be provided or performed by an input module 86.

A software interface module 306 may enable a user to use information from other (e.g. related or completely independent) software packages within in a project 116. For example, a loads program interface module 308 may work in conjunction with, or provide the functionality of, a loads program. A loads program is typically a software package enabling a user to enter information concerning the building an HVAC system will service. Based on this information the loads program typically calculates the air flow and heating requirements for the spaces in the building.

A loads program interface module 308 may read the output of a loads program provided and automatically create a design element. For example, a loads program may calculate that a building is going to require a certain flow rate of air as well as require a specific amount of heat input or heat output. The loads program interface module 308 may automatically create the components 124 and connections 126 necessary to describe an air handler satisfying the air flow requirements. The loads program interface module 308 may also create components 124 and connections 126 necessary to describe a boiler or chiller suitable for satisfying heating or cooling requirements, respectively.

A CAD software interface module 310 may enable a user or a computer 11 to read directly the output data of a computer aided design (CAD) software package in order to acquire data concerning the interior spaces in a building designed with such a package (application). The CAD software interface module may automatically (or with user intervention) create components 124 or connections 126 based on the data output by the CAD software. For example, a building designed using a CAD software package may include descriptions of several rooms. The CAD software interface module 310 may read the description of the rooms, automatically create components 124 describing the rooms, and insert them into a project 116.

A CAD software interface module 310 may also create other components 124 and connections 126 needed to provide HVAC services to the spaces. For example the CAD software interface module 310 may create boilers, chillers, and air handlers and connect them to the spaces, sparing the user the work of creating them, sizing them, or calculating properties thereof manually or independently.

A retrieval module 312 may read in design data 114 that has been written to an output device 24 for substantially permanent storage. Thus, a user may further access or modify the design data 114.

Figure 14:
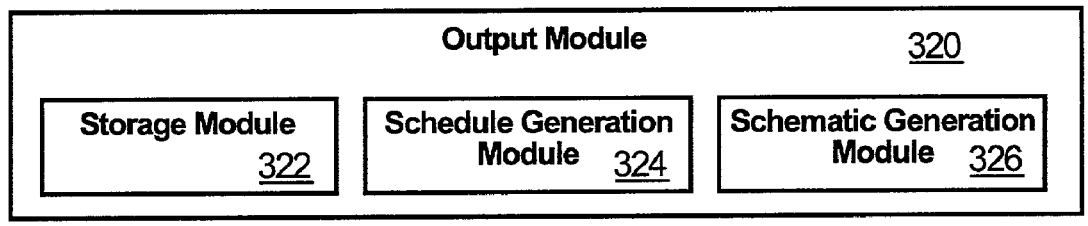
FIG. 14 is a schematic block diagram of data structures suitable for implementing an output module in accordance with the invention.

Referring to FIG. 14, an output module 320 may include a storage module 322, a schedule generation module 324, and a schematic generation module 326. A storage module 322 may write design data 114 to an output device 24 for more substantially permanent storage. Typically, a storage module will store design data 114 on a hard disk 46 or any other type of storage device 14. A schedule generation module 324 may generate various schedules (e.g. lists) describing a project 116. Schedules generated by a schedule generation module 324 may include parts lists, cost summaries, power consumption summaries, and the like.

A schematic generation module 326 may generate schematic representations of a project 116. Schematics that may be generated may include hydronics schematics, air flow schematics, air handler schematics and the like. The schematic generation module 326 may output the schematics in a computer readable form to any output device 24.

Figure 15:
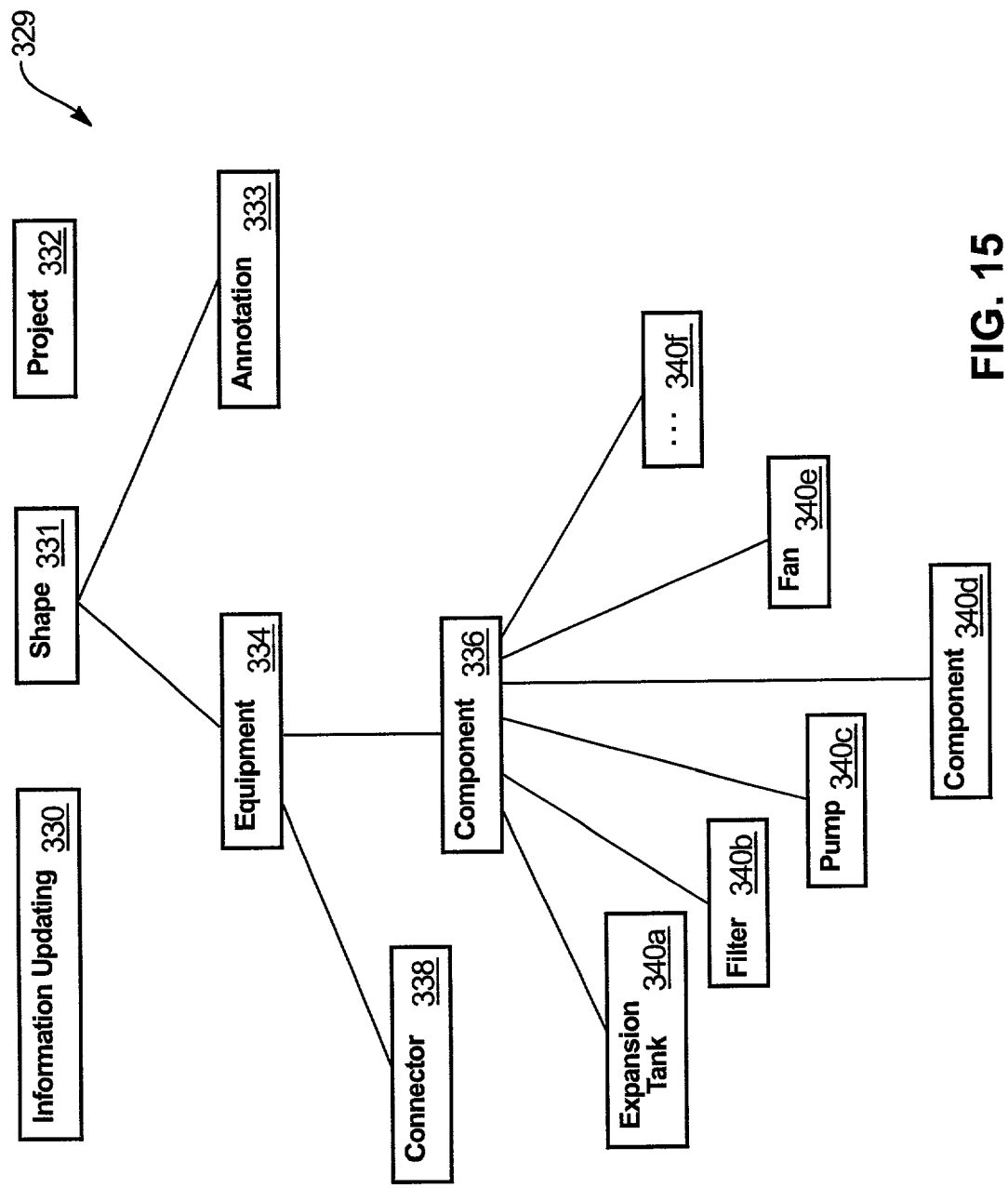
FIG. 15 is a schematic block diagram illustrating at least one embodiment of a hierarchical object oriented architecture suitable for use in the invention.
Figure 16:
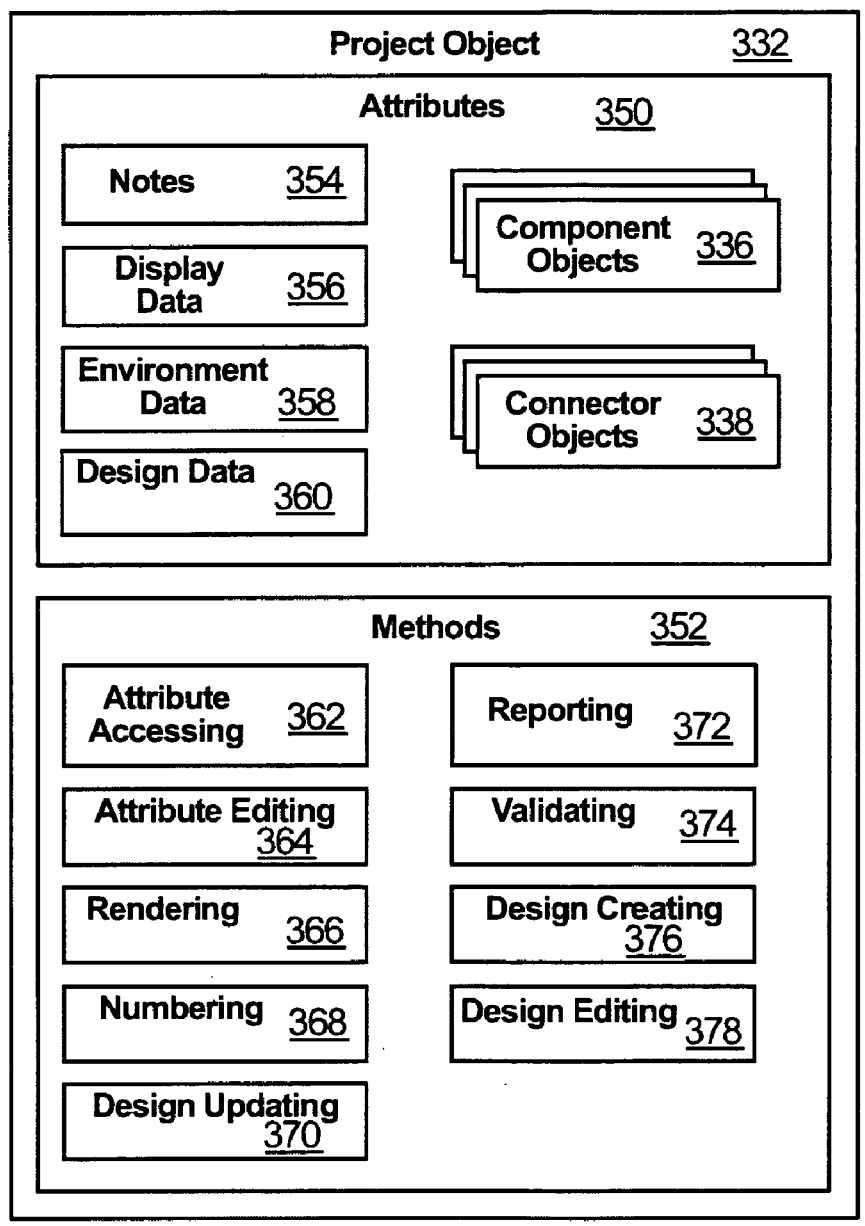
FIG. 16 is a schematic block diagram of data structures suitable for implementing a project object in accordance with the invention.

Referring to FIG. 15, an apparatus 10 may be implemented using an object-oriented architecture 329. The functionality and operational data of the modules 82, 84, 86, 88, 90, 92, 94, 96, 98 and 102 may be provided by objects having both methods and attributes. In one embodiment an object oriented architecture 329 of an apparatus 10 may include information updating objects 330 and project objects 332.

The various elements of a design and functionality thereof may be embodied in a heirerachical scheme wherein objects 340a–340f representing components, inherit from a component object 336, which may inherit from an equipment object 334, which may inherit from a shape object 331. Likewise a connector object 338 may also inherit from an equipment object 334. Other objects may inherit from a connector 338. For example, a pipe object, duct object, or the like may inherit from a connector 338. In all of these cases inheritance implies that an object posses all of the methods and attributes possessed by the object from which it inherits.

An annotation object may contain text to associated with another object. An annotation object may include text and values to be displayed as well as data linking it to an equipment object 334, or project object 332. An annotation object 333 may contain data locating it on a screen as well as data determining its size. An annotation object 333 may include methods for accessing its attributes, modifying its screen position, updating the displayed text to reflect modifications to its attributes, and other necessary methods. In some embodiments an annotation object 333 may display text reflecting the attributes of the object 332,334 to which it is linked. In such an embodiment the updating method may automatically update the text displayed on the screen to reflect changes made to the attributes it reflects. For example, a boiler may have an annotation object 333 associated with it that displays the value for the boilers outlet temperature. In some embodiments an annotation object 333 may inherit from a shape object 331.

A project object 332 may have attributes 350 comprising, for example, notes 354, display data 356, environment data 358, and design data 360. Notes 354 may comprise descriptive data that a user may want to add to a project such as comments justifying design decisions, or suggestions for implementation of a project. Notes 354 may also include annotation objects 333 that a project object 332 contains.

Display data 356 may contain data determining how information is to be displayed by an output device 24. Display data 356 may include font settings, page formatting data, color settings, sizing settings, and the like. Environment data 358 may include information describing the physical location where the actual project being designed will be built. This information may include outside air conditions, geographies location, altitude, characteristics of the electricity supplied, and the like.

Design data 360 may include data describing the design a project contains. Design data 360 may include default data for the components 124 and connections 126 a project object 332 contains. The default data may be set by a user for a specific project object 332. For example, a user may specify that every component or connection of a particular type have a default value for some or all of its attributes. Design data 360 may include preferences that govern the behavior of the apparatus 10 that a user wants to associate with a particular project object 332. This behavior may include the units in which variables are displayed, the appearance of a user interface, and the like.

A project object may also contain components 124 and connections 126, which may be embodied as instances of component objects 336 and connector objects 338, respectively.

The methods of a project object 332 may include, for example, attribute accessing methods 362, attribute editing methods 364, rendering methods 366, numbering methods 368, design updating methods 370, reporting methods 372, validating methods 374, design creating methods 376 and design editing methods 378. Attribute accessing methods 362 and attribute editing methods 364 may enable a user to access and edit, respectively, the attributes 350 of a project object 332.

A rendering method 366 may function in conjunction with rendering methods 430, 450 of the component objects 336 and connector objects 338 it contains. Thus it may support display of a graphical description of a project object 332 on an output device 24. Numbering methods 368 may assign and store identifying data corresponding to the components 124 and connections 126 of a project object 332 when they are added to a project object 332. Numbering methods 368 may also enable a user to modify the identifying data of the components 124 and connections 126.

Design updating methods 370 may maintain the consistency of the components 124, connections 126, and design data 360, such that when some data is modified, other data that is dependent on it is updated to reflect the change. A reporting method 372 or methods 372 may gather information from the attributes 350 of a project object 332 to generate reports, such as cost summaries, parts lists, and the like. A validating method 374 may analyze the attributes 350 of a project object 332 and determine if there are any unacceptable design configurations or parameters. A design creating method 376 may enable a user to insert components 124 and connections 126 into a project object 332. A design editing method 378 may permit a user or other objects to access and edit the attributes 350 of a project object 332.

Figure 17:
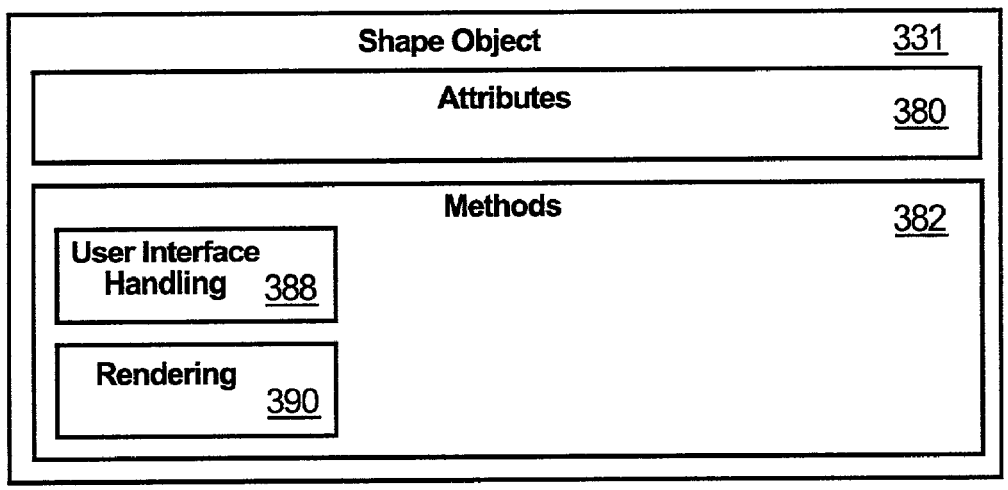
FIG. 17 is a schematic block diagram of data structures suitable for implementing a shape object in accordance with the invention.

Referring to FIG. 17, the attributes of a shape object may have attributes 380 consisting of operational data necessary for the function of the methods 382. The methods 382 may comprise user interface handling method 388 and rendering methods 390. The methods 382 may be virtual functions which are defined by objects which inherit from the shape object 331. The user interface handling method 388 may receive and interpret mouse clicks, mouse movements, and the like. For example, a user interface method 388 may move the graphical representation of a shape object to a different location on a computer screen based on the movement of a mouse by a user.

Figure 18:
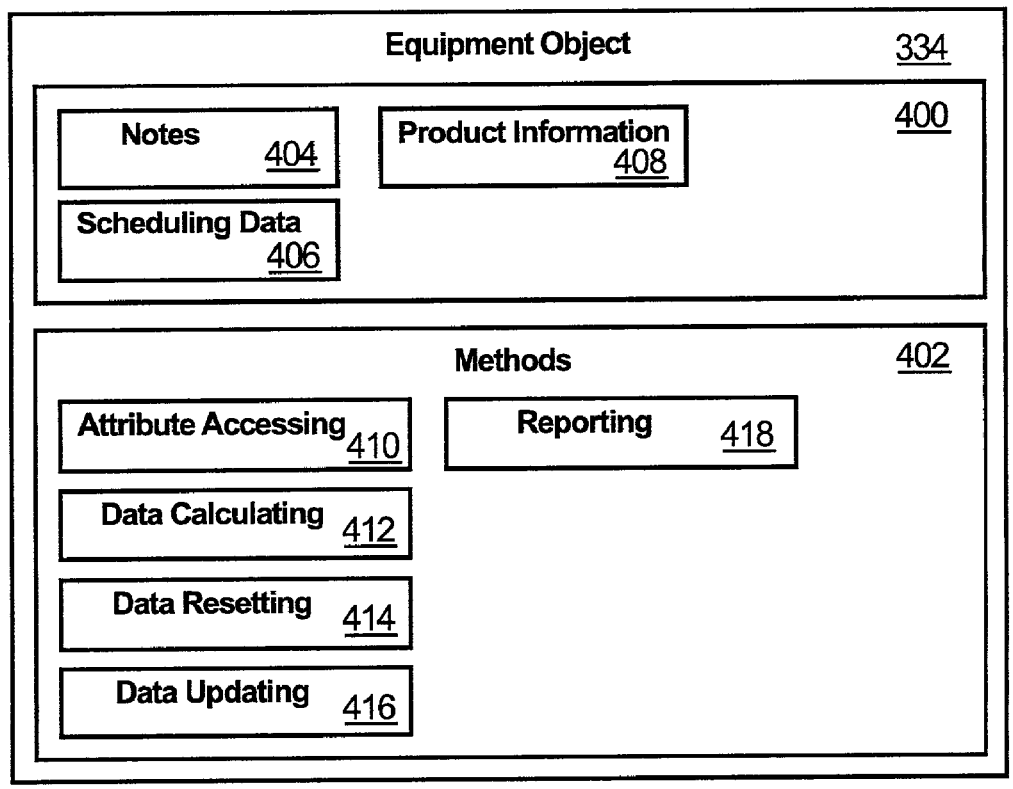
FIG. 18 is a schematic block diagram of data structures suitable for implementing an equipment object in accordance with the invention.

Referring to FIG. 18, an equipment object 334 may inherit the methods and attributes of a shape object 331 as known in the object-oriented programming art. The attributes 334 of an equipment object 334 may, for example, comprise notes 404, scheduling data 406, and product information 408.

Notes 404 may likewise, for example, comprise any text a user may choose to associate with an instance of an equipment object 334. Notes 404 may also comprise data uniquely identifying an instance of an equipment object 334, notes may also be embodied as annotation objects 333 added by a user or associated automatically with an equipment object 334. Scheduling data 406 may comprise data needed for compiling reports or schedules about a project 116*a*, 116*b*. Scheduling data for an equipment object may include items such as cost, energy consumption, and the like.

Product information 408 may include the name of the manufacturer or supplier of suitable equipment of the type or of the specific rating or model that the equipment object 334 represents. Product information 408 may also include the equipment's price or any other information associated with actual manufactured equipment.

The methods 402 of an equipment object 334 may include, for example, attribute accessing methods 410, data calculating methods 412, data updating 416 methods and reporting methods 418. Attribute accessing methods may enable a user or even other objects to access the attributes of an instance of an equipment object 334. Data calculating methods 412 may calculate values for some of the attributes 400 of an instance of an equipment object 334 based on other attributes 400 of the instance.

A data resetting method 414 may restore the values of the attributes 400 to their values previous to some modification or calculation. A reporting method 418 may provide information that is to be reported to the reporting method 372 of a project object 332. Reported data may include the energy usage data, cost and any other data that may need to be reported.

Figure 19:
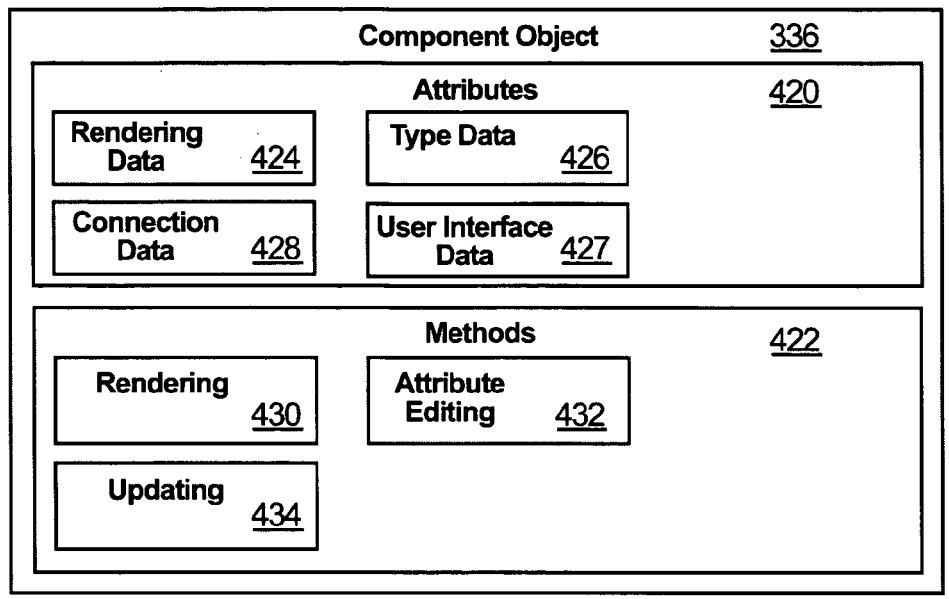
FIG. 19 is a schematic block diagram of data structures suitable for implementing a component object in accordance with the invention.

Referring to FIG. 19, a component object 336 may inherit attributes, methods, or both from an equipment object 334. The attributes 420 of a component object 336 may include, for example, rendering data 424, connection data 428, type data 426 and user interface data 427. Rendering data 424 may include a graphical representation of an instance of a component object 336, its screen location, size and the like. Connection data 428 may include information indicating instances of connector objects 338 (FIG. 20) connected to the component object 336. Connection data 428 may include information indicating other component objects 336 connected to a component object 336.

Type data 426 may include data indicating to which type of schematic an instance of a component object belongs. Type data 426 may also indicate what type of equipment a connection object pertains such as a pump, chiller, or the like. User interface data 427 may include information such as the screen location, size and the like of a component object 336.

The methods 422 of a component object 336 may include, for example, rendering methods 430, updating methods 434, and attribute editing methods 432. Rendering methods 430 may include methods that render a graphical representations of a component object 336 to a computer screen or other output device 24. Rendering methods 430 may also provide some of the same functionality as a mapping module 154.

Attribute editing methods 432 may provide a mechanism for a user or module 82, 84, 86, 88, 90, 92, 94, 96, 98, 102 to modify attributes 420. Updating methods 434 may provide for a component object to update its attributes 420 to reflect changes made to relevant data stored in an apparatus 10.

Figure 20:
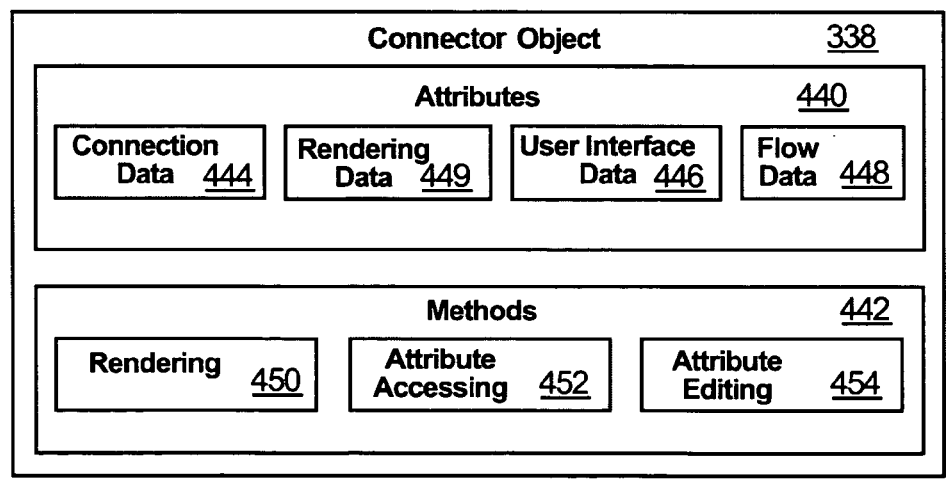
FIG. 20 is a schematic block diagram of data structures suitable for implementing a connector object in accordance with the invention.

Referring to FIG. 20, the attributes 440 of a connector object 338 may include, for example, connection data 444, rendering data 446, flow data 448 and user interface data 449. Connection data 444 may include information identifying the component objects 336 that a connector object 338 connects. Rendering data 446 may also include data governing how a connector object 338 is displayed graphically. Rendering data 446 may include the screen location of a connector object 338, its shape, or the screen location of points it passes through. Flow data 448 may include information regarding the type or direction of fluid that is to pass through a connector object 338.

The methods 442 of a connector object 338 may include, for example, rendering methods 450, attribute accessing methods 452 and attribute editing methods 454. Rendering methods 450 may include methods that render a graphical representations of a connector object 338 to a computer screen or other output device 24. Rendering methods 450 may also provide some of the same functionality as a mapping module 154. Attribute accessing and editing methods 452, 454 may provide for a user, or other objects, to access and modify, respectively, the attributes 440.

Figure 21:
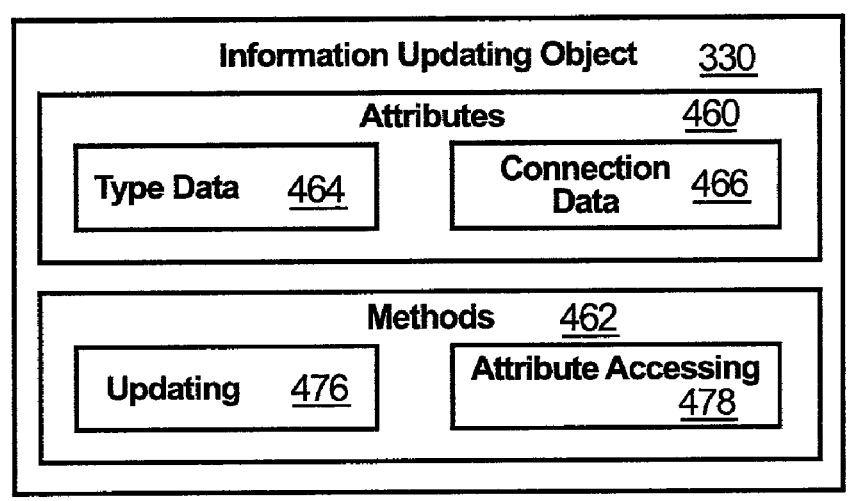
FIG. 21 is a schematic block diagram of data structures suitable for implementing an information updating object in accordance with the invention

Referring to FIG. 21, the attributes of an information updating object 330 may include, for example, type data 464, and connection data 466. A data updating method 416 of an equipment object 334 may create an information updating object in order to determine values for attributes 400. A data updating method 416 of a project object 332 may analyze all the information updating objects 330 created by the objects contained therein and determine the information that each equipment object 334 needs.

The attributes 460 of an information updating object 330 may include, for example, data necessary to enable a project object 332 to update the attributes of the objects contained therein. The attributes 460 may include, for example, type data 464 indicating what type of data an object needs. For example, a boiler object may need to know the inlet temperature of the fluid entering it. Accordingly a boiler object may generate an information updating object with type data 464 indicating that it needs fluid temperature data.

Connection data 466 may indicate to which other objects an object is connected to. A project object 332 may use this information to determine the needed information. For example, a boiler's inlet temperature is dependent on the other components 124 that connect to it.

An updating method 476 may update the attributes of an object when the values thereof have been determined by the design updating method 370. From the foregoing, it will be appreciated that the present invention provides a powerful, integrated tool for design and analysis of HVAC systems, with much of the integration and calculation transparent to a user.

The present invention may be embodied in other specific forms without departing from its spirit or essential characteristics. The described embodiments are to be considered in all respects only as illustrative, and not restrictive. The scope of the invention is, therefore, indicated by the eventual claims that may issue, rather than by any specific description. All changes that come within the meaning and range of equivalency of such claims are to be embraced within their scope.

The invention claimed is:

1. A computer-readable medium storing a computer program for designing an HVAC system, the computer program comprising:
   an input module configured to receive inputs corresponding to design elements, characterized by properties stored in records, to design elements being connectable to establish an HVAC system to be designed;
   a design module operably connected to the input module and configured to operate on the inputs to create the records reflecting the properties of the design elements and interactions thereof to establish a design of the HVAC system;
   the input module and design module, further configured to automatically provide multiple schematic representations of different types of a selected design element, selected from the design elements, the multiple schematic representations reflecting distinct operational contexts of the selected design element, the distinct operational contexts comprising a first operational context representing the transport of mass, and a second operational context representing the transport of energy, wherein each schematic representation is made using a separate distinct palette of icons of components suited for that operational context, and to automatically maintain substantially complete and consistent information in the records, describing the properties of the selected design element in each of the distinct operational contexts; and
   an output module configured to provide a user-interpretable output reflecting the design of the HVAC system.

2. The computer-readable medium of claim 1, wherein the computer program further comprises a user interface module configured to receive inputs from a user to control selection, relative positioning, and properties of design elements of the HVAC system to be designed and configured to output to a user a graphical representation of the HVAC system reflecting the selection, relative positioning, and properties of the design elements.

3. The computer-readable medium of claim 2, wherein the user interface module further comprises a selection module providing a palette of icons representing design elements selectable arbitrarily by a user and connectable to one another in a schematic work space to establish the HVAC system design.

4. The computer-readable medium of claim 1, wherein the input module further comprises a user interface module configured to:
   receive inputs from a user to control selection, relative positioning, and properties of design elements of the HVAC system to be designed, and
   output to a user a graphical representation of the HVAC system reflecting the selection, relative positioning, and properties of the design elements.

5. The computer-readable medium of claim 1, wherein the operational contexts are selected from mass transport and energy transport.

6. The computer-readable medium of claim 5, wherein mass transport includes at least one of air transport and water transport, and wherein energy transport includes at least one of heating and cooling with respect to the selected design element.

7. The computer-readable medium of claim 1, wherein:
   the selected design element comprises a product available from a vendor, independent from the article, the product characterized by product properties corresponding thereto; and
   the design module further comprises a specification module, executable to assign the product properties as the properties of the selected design element.

8. The computer-readable medium of claim 7, wherein the computer program further comprises a product module configured to manage data reflecting the product properties.

9. The computer-readable medium of claim 8, wherein the product module further comprises an updating module configured to update the product properties 10. The computer-readable medium of claim 7, wherein the computer program further comprises a communication module configured to automatically establish communication between a user and the vendor of the product.

11. The computer-readable medium of claim 10, wherein the communication module is further configured to do at least one of making inquiries of the vendor, placing orders with the vendor, and downloading updated values of the product properties from the vendor.

12. The computer-readable medium of claim 1, wherein the computer program further comprises a load module configured to provide, to the input module, HVAC loading parameters required to be accommodated by the HVAC system design.

13. The computer-readable medium of claim 12, wherein the computer program further comprises a CAD module configured to provide, to the input module, data reflecting a design of an edifice to be serviced by the design of the HVAC system.

14. The computer-readable medium of claim 13, wherein the computer program further comprises a product module configured to specify products available for sale and meeting requirements to be the design elements.

15. The computer-readable medium of claim 14, wherein the computer program further comprises a compensation module configured to identify monetary compensation due to a a provider of the computer program from vendors of the products specified as design elements in the HVAC system design.

16. The computer-readable medium of claim 14, wherein the product module further comprises a specification module configured to provide a detailed specification for an arbitrary number of selected design elements.

17. The computer-readable medium of claim 16, wherein:
the product module further comprises product data corresponding to products available from vendors to serve as the design elements, and
the specification module further comprises a filter module configured to sort the products by features thereof and priorities of the features, each selectable by a user, in order to automatically specify detailed parameters characterizing a product selected by a user to serve as the selected design element.

18. The computer-readable medium of claim 1, wherein the input module is further configured to interact with:
a CAD module provided by an independent third party to provide, to the input module, data reflecting a design of an edifice to be serviced by the design of the HVAC system;
a load module configured to receive outputs from the CAD module and provide, to the input module, HVAC loading parameters required to be met by the HVAC system design; and
a vendor module, provided by an independent vendor and configured to specify products available for sale and meeting the requirements to be the design elements.

19. The computer-readable medium of claim 1, wherein the output module is further configured to do at least one of generating reports, drawing schematic illustrations, providing schedules of components, and providing performance analyses reflecting the design elements.

20. A method for designing an HVAC system, the method comprising:
providing a database having records and configured to manage values of properties corresponding to design elements corresponding to substantially all physical components and connections available for creating an HVAC system design;
providing a user interface configured to represent design elements arbitrarily selectable by a user and connectable to one another in a schematic to establish the HVAC system design;
providing, automatically, default values corresponding to the properties corresponding to the design elements;
selecting arbitrarily, from the design elements, by a user, an arbitrary number of selected design elements to be interconnected in the HVAC system design;
selecting, by a user, a relative location and interconnections corresponding to each selected design element;
automatically providing multiple schematic representations of different types of at least one of the selected design elements, the multiple schematic representations reflecting distinct operational contexts of the selected design elements, the distinct operational contexts comprising a first operational context representing the transport of mass, and a second operational context representing the transport of energy, wherein each schematic representation is made using a separate distinct palette of icons of components suited for that operational context;
calculating, automatically, values of properties characterizing the selected design elements;
validating correctness of the interconnections and properties;
calculating performance parameters corresponding to the HVAC system design; and
providing drawings defining the HVAC system design for construction.

21. The method of claim 20, further comprising creating and outputting schedules specifying each of the arbitrarily selected design elements.

22. The method of claim 21, further comprising providing a list of products and corresponding vendors meeting the performance parameters corresponding to the selected design elements.

23. The method of claim 22, further comprising automatically downloading from a vendor updated lists of products and corresponding properties.

24. The method of claim 20, further comprising obtaining, from a loads program, selected performance parameter requirements corresponding to the design elements.

25. The method of claim 24, further comprising:
providing an input module configured to support user selection of design elements; and
interacting the input module with the loads program to provide selected inputs automatically to the input module.

26. The method of claim 25, further comprising:
providing a CAD program to provide inputs, corresponding to a structure to be served by the HVAC design, into the loads program.

27. A computer-readable medium storing a computer program for designing an HVAC system, the computer program comprising:
an input module configured to receive inputs corresponding to design elements, characterized by properties stored in records, the design elements being connectable to establish an HVAC system to be designed;
a design module operably connected to the input module and configured to operate on the inputs to create the records reflecting the properties of the design elements and interactions thereof to establish a design of the HVAC system;
the input module and design module, further configured to automatically provide multiple schematic representations of different types of a selected design element, selected from the design elements, the multiple schematic representations reflecting distinct operational contexts of the selected design element, the distinct operational contexts comprising a first operational context, representing the transport of mass, and a second operational context, representing the transport of energy, wherein each schematic representation is made using a separate distinct palette of icons of components suited for that operational context;
the design and input modules, further configured to automatically maintain substantially complete and consistent information in the records, describing the properties of the selected design element in each of the distinct operational contexts; and
an output module configured to provide a user-interpretable output reflecting the design of the HVAC system.

* * * * *